United States Patent
Zhou et al.

(10) Patent No.: US 12,167,253 B2
(45) Date of Patent: Dec. 10, 2024

(54) INTER-BASE STATION INTERFERENCE MITIGATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 17/677,841

(22) Filed: Feb. 22, 2022

(65) Prior Publication Data

US 2023/0269599 A1 Aug. 24, 2023

(51) Int. Cl.
*H04W 16/28* (2009.01)
*H04B 17/336* (2015.01)
*H04L 5/00* (2006.01)
*H04W 24/10* (2009.01)

(52) U.S. Cl.
CPC .......... *H04W 16/28* (2013.01); *H04B 17/336* (2015.01); *H04L 5/0051* (2013.01); *H04W 24/10* (2013.01)

(58) Field of Classification Search
CPC .... H04W 16/28; H04W 24/10; H04B 17/336; H04L 5/0051
See application file for complete search history.

(56) References Cited

U.S. PATENT DOCUMENTS

| | | | | |
|---|---|---|---|---|
| 2019/0274155 A1* | 9/2019 | Bhattad | ................. | H04L 5/0073 |
| 2019/0312619 A1* | 10/2019 | Abedini | ............... | H04B 7/0695 |
| 2021/0007117 A1* | 1/2021 | Park | ..................... | H04B 7/0617 |
| 2022/0022204 A1* | 1/2022 | Fehrenbach | .......... | H04W 72/12 |

* cited by examiner

*Primary Examiner* — Kevin M Cunningham
(74) *Attorney, Agent, or Firm* — QUALCOMM Incorporated

(57) ABSTRACT

Methods, systems, and devices for wireless communications are described. Aspects of the present disclosure provide techniques for restricting beams that may lead to inter-base station interference. For example, an implicit restriction of beams may be used by a first and second base station (e.g., a victim and aggressor base station, respectively). In such cases, the first base station may indicate a period, a subband, or both, associated with one or more scheduled uplink beams that the first base station may use for receiving uplink transmissions. The second base station may select beams that avoid interference with the uplink beam(s) of the first base station. Additionally or alternatively, an explicit restriction of beams may be signaled, where the first base station may explicitly indicate a set of downlink beams associated with the second base station that are allowed (e.g., beams that avoid interference with uplink transmissions at the first base station).

29 Claims, 13 Drawing Sheets

INTER-BASE STATION INTERFERENCE MITIGATION

FIELD OF TECHNOLOGY

The following relates to wireless communications, including inter-base station interference mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may operate using full-duplex communications. For example, a base station may simultaneously communicate both uplink and downlink signaling (e.g., with a same UE or with two or more different UEs). In some cases, however, such techniques may result in interference from one or more other base stations. For example, a first base station (e.g., a victim base station) may communicate using full-duplex techniques, and one or more concurrent transmissions by a second base station (e.g., an aggressor base station) may interfere with signals received by the victim base station.

SUMMARY

The described techniques relate to improved methods, systems, devices, and apparatuses that support inter-base station interference mitigation. Generally, the described techniques provide for selecting beams to avoid inter-base station interference. For example, a first technique relates to an implicit restriction of beams used by an aggressor base station. Specifically, a victim base station may indicate a period, subband, or both, associated with one or more scheduled uplink beams that the victim base station may use to receive an uplink transmission from a user equipment (UE). The aggressor base station, upon receiving the indication of the period, the subband, or both, may avoid using beams on resources that conflict with the indicated period or subband for downlink transmissions, thereby preventing or reducing inter-base station interference. In such cases, the aggressor base station may transmit downlink messages on other beams and resources that enable the victim base station to receive uplink transmissions with limited or no interference from the aggressor base station.

Additionally or alternatively, an explicit restriction of beams at the aggressor base station may be used. For instance, in a second technique, the victim base station may explicitly indicate which downlink beams of the aggressor base station are allowed or disallowed (e.g., in some time duration), where the allowed and/or disallowed beams may be based on one or more measurements performed by the victim base station. In some cases, in addition to, or instead of, indicating allowed or disallowed beams, the victim base station may indicate (e.g., via time resources, frequency resources, or both) a restriction of one or more transmission parameters (e.g., instructing the aggressor base station to reduce a transmission power associated with beams that may lead to inter-base station interference), which may likewise result in relatively reduced interference from the aggressor base station to the victim base station.

A method for wireless communications at a first network entity is described. The method may include receiving, from a second network entity, one or more repetitions of a reference signal over a first set of one or more directional beams, the first set of one or more directional beams used by the second network entity for receiving uplink messages, performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages, and transmitting one or more downlink messages to the wireless device using the second set of one or more directional beams.

An apparatus for wireless communications at a first network entity is described. The apparatus may include a processor, memory coupled with the processor, and instructions stored in the memory. The instructions may be executable by the processor to cause the apparatus to receive, from a second network entity, one or more repetitions of a reference signal over a first set of one or more directional beams, the first set of one or more directional beams used by the second network entity for receiving uplink messages, perform interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages, and transmit one or more downlink messages to the wireless device using the second set of one or more directional beams.

Another apparatus for wireless communications at a first network entity is described. The apparatus may include means for receiving, from a second network entity, one or more repetitions of a reference signal over a first set of one or more directional beams, the first set of one or more directional beams used by the second network entity for receiving uplink messages, means for performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages, and means for transmitting one or more downlink messages to the wireless device using the second set of one or more directional beams.

A non-transitory computer-readable medium storing code for wireless communications at a first network entity is described. The code may include instructions executable by a processor to receive, from a second network entity, one or more repetitions of a reference signal over a first set of one or more directional beams, the first set of one or more directional beams used by the second network entity for receiving uplink messages, perform interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages, and transmit one or more downlink messages to the wireless device using the second set of one or more directional beams.

Some examples of the method, apparatuses, and non-transitory computer-readable medium described herein may further include operations, features, means, or instructions for receiving, from the second network entity, a message indicating a time period during which the first set of one or more directional beams may be used by the second network entity for receiving the uplink messages, one or more subbands on which the uplink messages may be received using the first set of one or more directional beams, or both, where performing the interference measurements may be based on the time period or the one or more subbands, or both.

In some examples of the method, apparatuses, and non-transitory computer-readable medium described herein, the message indicates a number of the one or more repetitions of the reference signal for each directional beam of the first set of one or more directional beams within the time period.

In some examples of the method, apparatuses, and non-transitory computer-readable medium described herein, the time period or the one or more subbands, or both, may be associated with one or more dynamically scheduled transmission occasions or one or more semi-static transmission occasions, or any combination thereof, for the second network entity.

In some examples of the method, apparatuses, and non-transitory computer-readable medium described herein, the one or more semi-static transmission occasions include an uplink configured grant occasion, a random access occasion, or any combination thereof.

In some examples of the method, apparatuses, and non-transitory computer-readable medium described herein, the one or more dynamically scheduled transmission occasions includes a scheduled physical uplink channel occasion.

Some examples of the method, apparatuses, and non-transitory computer-readable medium described herein may further include operations, features, means, or instructions for receiving, from the second network entity, a second message indicating time and frequency resources that correspond to the one or more repetitions of the reference signal, where performing the interference measurements may be based on the time and frequency resources.

In some examples of the method, apparatuses, and non-transitory computer-readable medium described herein, the one or more repetitions of the reference signal include one or more repetitions of a synchronization signal block (SSB) from the second network entity.

Some examples of the method, apparatuses, and non-transitory computer-readable medium described herein may further include operations, features, means, or instructions for receiving, from the second network entity, SSB identifiers corresponding to the one or more repetitions of the SSB, where performing the interference measurements may be based on the SSB identifiers.

In some examples of the method, apparatuses, and non-transitory computer-readable medium described herein, the one or more repetitions of the reference signal may be associated with a beam refinement procedure at the second network entity.

Some examples of the method, apparatuses, and non-transitory computer-readable medium described herein may further include operations, features, means, or instructions for identifying, based on performing the interference measurements, a third set of one or more directional beams of the first network entity, the third set of one or more directional beams being excluded from transmitting the one or more downlink messages based on reference signals corresponding to the third set of one or more directional beams failing to satisfy the threshold.

A method for wireless communications at a first network entity is described. The method may include receiving, from a second network entity, one or more reference signals over a first set of one or more directional beams, the first set of one or more directional beams for transmitting downlink messages to a wireless device, performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages, and transmitting, to the second network entity, a message including an indication of which directional beams of the first set of one or more directional beams are allowed for transmitting the downlink messages to the wireless device based on the set of beam pairs.

An apparatus for wireless communications at a first network entity is described. The apparatus may include a processor, memory coupled with the processor, and instructions stored in the memory. The instructions may be executable by the processor to cause the apparatus to receive, from a second network entity, one or more reference signals over a first set of one or more directional beams, the first set of one or more directional beams for transmitting downlink messages to a wireless device, perform interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages, and transmit, to the second network entity, a message including an indication of which directional beams of the first set of one or more directional beams are allowed for transmitting the downlink messages to the wireless device based on the set of beam pairs.

Another apparatus for wireless communications at a first network entity is described. The apparatus may include means for receiving, from a second network entity, one or more reference signals over a first set of one or more directional beams, the first set of one or more directional beams for transmitting downlink messages to a wireless device, means for performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages, and means for transmitting, to the second network entity, a message including an indication of which directional beams of the first set of one or more directional beams are allowed for transmitting the downlink messages to the wireless device based on the set of beam pairs.

A non-transitory computer-readable medium storing code for wireless communications at a first network entity is described. The code may include instructions executable by a processor to receive, from a second network entity, one or more reference signals over a first set of one or more directional beams, the first set of one or more directional beams for transmitting downlink messages to a wireless device, perform interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages, and transmit, to the second network entity, a message including an indication of which directional beams of the first set of one or more directional beams are allowed for transmitting the downlink messages to the wireless device based on the set of beam pairs.

Some examples of the method, apparatuses, and non-transitory computer-readable medium described herein may further include operations, features, means, or instructions for determining which directional beams of the second set of one or more directional beams may be used by the first network entity for receiving one or more uplink messages during a time period, where the message further indicates the time period during which the directional beams of the first set of one or more directional beams may be allowed.

In some examples of the method, apparatuses, and non-transitory computer-readable medium described herein, the message further indicates which directional beams of the first set of one or more directional beams may be disallowed for transmitting the downlink messages to the wireless device.

In some examples of the method, apparatuses, and non-transitory computer-readable medium described herein, the message further indicates a time period during which the directional beams of the first set of one or more directional beams may be disallowed.

In some examples of the method, apparatuses, and non-transitory computer-readable medium described herein, transmitting the message may include operations, features, means, or instructions for transmitting the message to the second network entity in accordance with a periodicity.

Some examples of the method, apparatuses, and non-transitory computer-readable medium described herein may further include operations, features, means, or instructions for transmitting, to the second network entity, a second message including an indication of the set of beam pairs.

In some examples of the method, apparatuses, and non-transitory computer-readable medium described herein, the message further includes an indication of a restriction of one or more transmission parameters for transmitting the downlink messages to the wireless device based on the interference measurements.

In some examples of the method, apparatuses, and non-transitory computer-readable medium described herein, the restriction of the one or more transmission parameters includes a power backoff.

In some examples of the method, apparatuses, and non-transitory computer-readable medium described herein, the message further includes an indication of time resources to apply the restriction, frequency resources to apply the restriction, or both, the time resources and the frequency resources corresponding the uplink messages to be received by the first network entity.

In some examples of the method, apparatuses, and non-transitory computer-readable medium described herein, the message includes an over-the-air message, a backhaul message, or both.

In some examples of the method, apparatuses, and non-transitory computer-readable medium described herein, the interference measurement corresponds to received signal strength indicator measurements, reference signal received power measurements, or any combination thereof.

In some examples of the method, apparatuses, and non-transitory computer-readable medium described herein, the one or more reference signals include SSBs.

DETAILED DESCRIPTION

Figure 1:
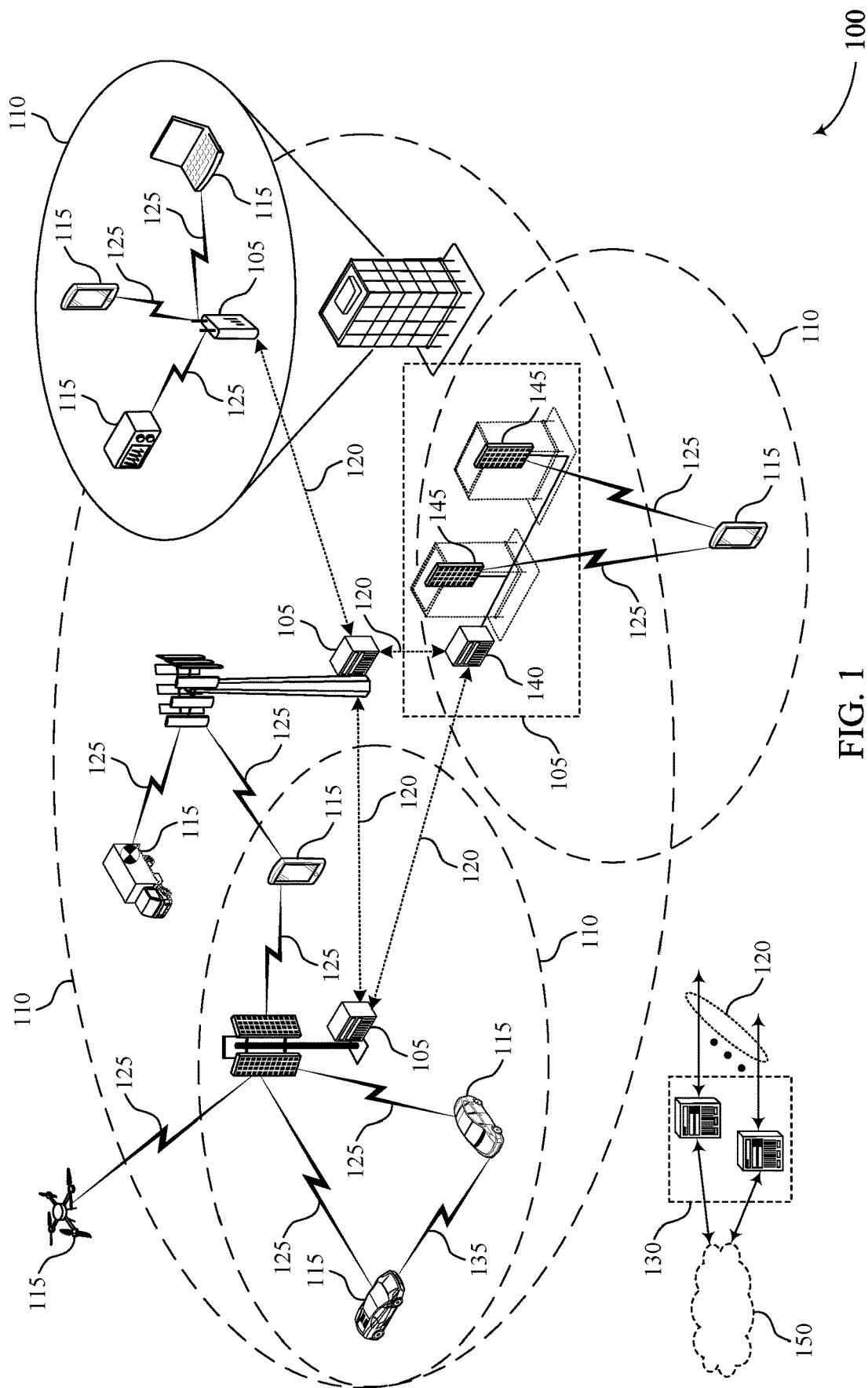
FIG. 1 illustrates an example of a wireless communications system that supports inter-base station interference mitigation in accordance with aspects of the present disclosure.

Some wireless communications systems may operate using a full-duplex techniques, for example, to increase signaling throughput and reduce latency. As an example, a network entity (e.g., a base station) may simultaneously receive uplink signaling from a user equipment (UE) and transmit downlink signaling to one or more other UEs on resources configured for full-duplex communications. Based on the concurrent transmission and reception by the base station, an uplink transmission may be interfered with by a concurrent downlink transmission by the base station, which may be referred to as self-interference and may be mitigated using various techniques. In some cases, however, interference at a base station may be caused by transmissions (e.g., downlink transmissions) by one or more other base stations. For example, a first base station (e.g., an aggressor base station) may transmit on a downlink to a UE, and a second base station (e.g., a victim base station) may inadvertently receive the downlink transmission(s) by the aggressor base station while concurrently performing uplink reception of one or more signals (e.g., from another UE). The downlink transmission from the aggressor base station may cause interference at the victim base station, which may degrade signaling quality (e.g., cause interfere with the uplink transmission), among other issues. In other cases, two base stations may interfere with each other due to a misaligned time-division duplexing (TDD) configuration (e.g., due to an uncompensated propagation delay). For example, an aggressor base station may transmit a downlink message during a scheduled uplink slot used by a second base station for receiving uplink signals. Such inter-base station interference may, in some cases, be referred to as cross-link interference.

Aspects of the present disclosure describe techniques for signaling of restrictions for directional beams that may otherwise cause inter-base station interference. For instance, one technique may include using an implicit restriction of beams used by one or more aggressor base stations. Specifically, a victim base station may indicate, to an aggressor base station, a period, a subband, or both, associated with a scheduled uplink beam that the victim base station may use to receive an uplink transmission from a UE. The aggressor base station, upon receiving the indication of the period, the subband, or both, may avoid using beams that conflict with the indicated period or subband for downlink to avoid inter-base station interference.

In some examples, upon receiving the indication of the period and/or subband, the aggressor base station may perform measurements of reference signals transmitted on directional beams (e.g., uplink beams) by the victim base station. Based on the measurements, the aggressor base station may identify one or more directional beams (e.g., downlink beams) of the aggressor base station that generate relatively little interference (e.g., having an interference level below a threshold) at the victim base station. The identification of the aggressor base station's downlink beams may be based on channel reciprocity applied to the measurements. The aggressor base station may use the one or more directional beams identified via the measurements to transmit downlink signals at the same time the victim base station receives uplink signals with minimal or no interference to the victim base station. The aggressor base station may accordingly refrain from transmitting on other directional beams that may result in relatively increased interference to the victim base station (e.g., where corresponding reference signal measurements for the other beams may exceed the interference threshold).

Another technique described herein relates to an explicit restriction of beams. In such cases, the victim base station may signal, to the aggressor base station, an explicit indication of which downlink beams of the aggressor base station are allowed or disallowed, which may enable or disable some beams used by the aggressor base station when the victim base station is receiving uplink transmissions. In such cases, the victim base station may update measurements (e.g., periodically) for a set of inter-base station beam pairings (e.g., pairings corresponding to one or more uplink beams of the victim base station and one or more downlink beams of the victim base station) to identify which downlink beams of the aggressor base station cause interference on respective uplink beams of the victim base station. Thus, upon determining the uplink beam(s) scheduled to be used for a transmission (e.g., a future transmission), and based on interference measurements corresponding to the beam pairings, the victim base station may transmit a message to the aggressor base station signaling which downlink beams are allowed (and/or disallowed) for use at the same time the victim base station is scheduled to receive uplink transmissions. In some cases, in addition to, or instead of, indicating allowed and/or disallowed beams to the aggressor base station, the victim base station may indicate (e.g., via time resources, frequency resources, or both) a restriction, for example, instructing the aggressor base station to reduce power associated with beams that may lead to inter-base station interference. In any case, the restriction of beams by the aggressor base station may enable per-beam techniques for mitigating inter-base station interference, thereby enhancing communications efficiency and improving throughput in the system.

Aspects of the disclosure are initially described in the context of wireless communications systems. Aspects of the disclosure are further illustrated by and described with reference to diagrams and a process flow. Aspects of the disclosure are further illustrated by and described with reference to apparatus diagrams, system diagrams, and flowcharts that relate to inter-base station interference mitigation.

FIG. 1 illustrates an example of a wireless communications system 100 that supports inter-base station interference mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. For example, a network node can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (MC), or a Non-Real Time (Non-RT) MC. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. In some cases, synchronization signals (e.g., a primary synchronization signal (PSS), a secondary synchronization signal (SSS)) and/or broadcast information (e.g., a physical broadcast channel (PBCH)) may be transmitted within synchronization signal blocks (SSBs) on respective directional beams, where one or more SSBs may be included within an SSB burst. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

One or more base stations 105 may experience inter-base station interference during communications operations. For example, a base station 105 may experience inter-base station interference from another base station 105 due to an atmospheric ducting effect. While frameworks have been discussed to mitigate inter-base station interference due to atmospheric ducting effects, such frameworks may not be optimized for selecting beams to mitigate inter-base station interference. In addition, full-duplex operations (e.g., or flexible TDD operations) may result in inter-base station interference during communications (e.g., downlink transmissions from a second base station 105 may interfere with uplink transmissions received at the base station 105). As such, techniques to mitigate inter-base station interference may improve network reliability, signaling quality, and network efficiency.

Wireless communications system 100 may support techniques to restrict beams that may lead to inter-base station interference. For example, a first base station 105 (e.g., a victim base station 105) may utilize a technique relating to an implicit restriction of beams used by a second base station 105 (e.g., an aggressor base station 105). The first base station 105 may indicate a period, a subband, or both, associated with a scheduled uplink beam that base station 105 may use to receive an uplink transmission from a UE 115 such that the second base station 105 may not interfere with the uplink beam. Additionally or alternatively, an explicit restriction of beams may be signaled between the first base station 105 and the second base station 105, where the first base station 105 may explicitly indicate a set of downlink beams associated with the second base station 105 that are allowable (e.g., directional beams that do not interfere with scheduled uplink transmissions at the base station 105).

Figure 2:
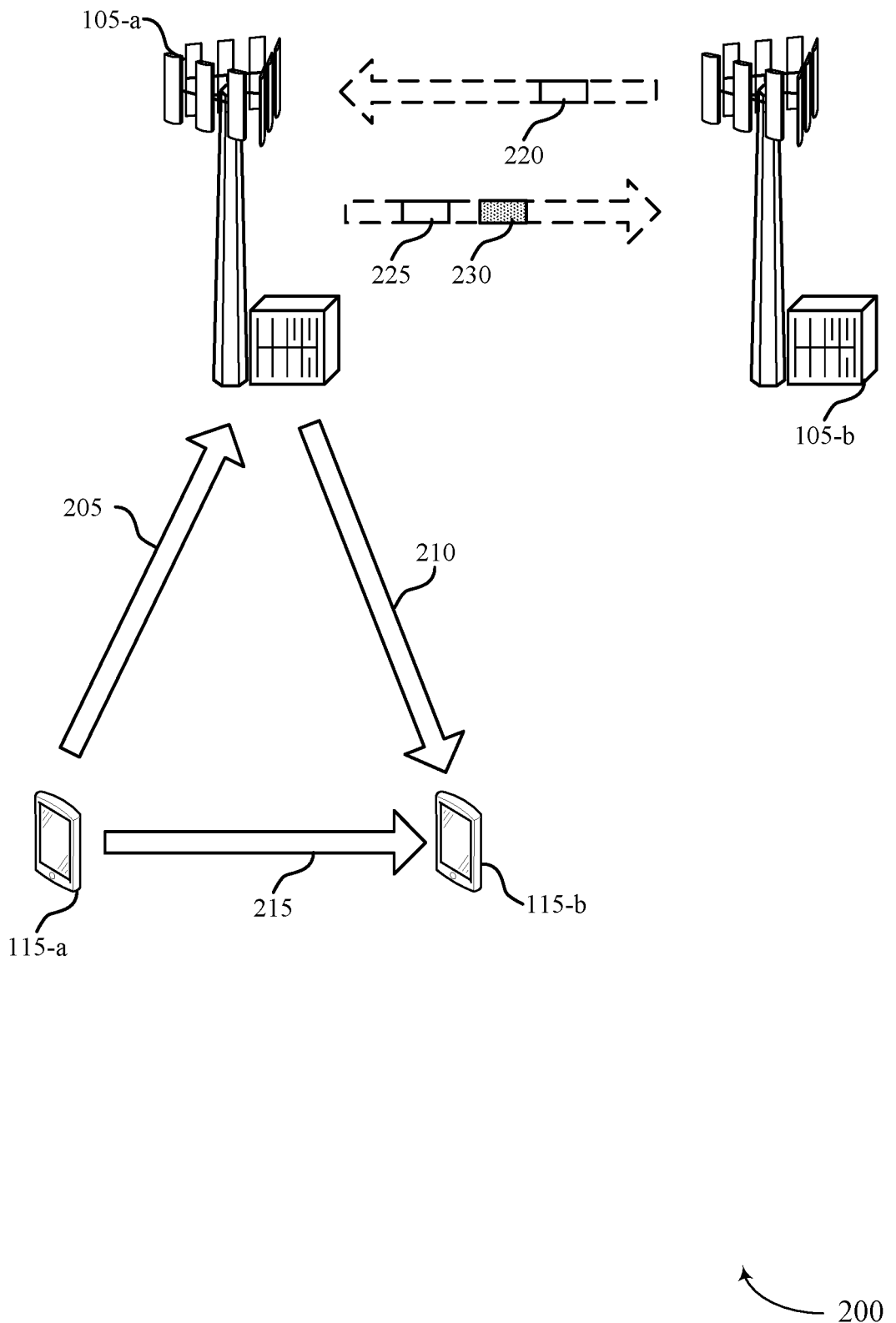
FIG. 2 illustrates an example of a wireless communications system that supports inter-base station interference mitigation in accordance with aspects of the present disclosure.

FIG. 2 illustrates an example of a wireless communications system 200 that supports inter-base station interference mitigation in accordance with aspects of the present disclosure. The wireless communications system 200 may implement or be implemented by one or more aspects of the wireless communications system 100. For example, the wireless communications system 200 may include a UE 115-a, a UE 115-b, and a base station 105-a, which may be examples of the UE 115 and the base station 105 as described with reference to FIG. 1. The UE 115-a, the UE 115-b, or both, may reside within a geographic coverage region associated with the base station 105-a. It should be noted that, while examples are discussed below, any number of devices and device types may be used to accomplish techniques described in the present disclosure.

In the wireless communications system 200, the base station 105-a may operate in an full-duplex capacity while the base station 105-a may operate in a half-duplex capacity. That is, the base station 105-a may simultaneously receive uplink communications from the UE 115-a (e.g., via a communication link 205) and transmit downlink communications to the UE 115-b (e.g., via a communication link 210), while the base station 105-b may transmit downlink information to another wireless device. In some cases, one or more devices within the wireless communications system 200 may experience interference. For example, the uplink transmissions from the UE 115-a may interfere with the downlink transmissions incident upon the UE 115-b (e.g., which may be referred to as cross-link interference 215).

As another example, the base station 105-b (e.g., an aggressor base station) may interfere with the base station 105-*a* (e.g., a victim base station). For example, the base station 105-*a* may instantiate one or more directional beams associated with a set of resources to receive uplink communications from the UE 115-*a*. The base station 105-*b*, however, may transmit downlink communications over one or more directional beams utilizing a similar set of resources during a same time period that the base station 105-*a* is receiving the uplink communications. As such, the downlink communications transmitted by the base station 105-*b* may be inadvertently received at the base station 105-*a* and interfere with uplink communications from the UE 115-*a*.

Aspects of the present disclosure provide for techniques for signaling a beam restriction between the base station 105-*a* and the base station 105-*b*. In such cases, the beam restriction may be based on interference measurements that indicate which downlink beams of the aggressor base station (e.g., base station 105-*b*) affect uplink beams at the victim base station (e.g., base station 105-*a*), such that a restricted set of directional beams used by the base station 105-*b* may not interfere with directional beams used by the base station 105-*a*.

For example, the base station 105-*b* (e.g., the aggressor base station) and the base station 105-*a* (e.g., the victim base station) may utilize an implicit beam restriction technique to deconflict directional beam resource usage such that the aggressor base station does not interfere with uplink communications at the victim base station. In such examples, the victim base station may transmit one or more repetitions of a reference signal 225 over a first set of one or more directional beams to the aggressor base station, where the first set of one or more directional beams may be associated with scheduled uplink communications. The victim base station may indicate, during the one or more repetitions, a period, subband, or both, associated with scheduled uplink communications.

The aggressor base station may receive the one or more repetitions of the reference signal 225 corresponding to scheduled uplink communications at the victim base station. In some cases, the aggressor base station may also receive an indication of the period, subband, or both, associated with the one or more repetitions of the reference signal 225. Based on the one or more repetitions of the reference signal 225, the period, the subband, or some combination thereof, the aggressor base station may determine a second set of one or more directional beams to use for downlink communications such that the second set of one or more directional beams does not interfere with the first set of one or more directional beams. In some examples, the second set of one or more directional beams may be a subset of the directional beams available at the aggressor base station.

The aggressor base station may perform interference measurements on the one or more repetitions of the reference signal 225. The interference measurements may correspond to determining the second set of one or more directional beams based on the second set of one or more directional beams satisfying an interference threshold level. That is, the aggressor base station may determine the second set of one or more directional beams such that subsequent downlink transmissions from the aggressor base station do not interfere with concurrent uplink communications at the victim base station (e.g., the downlink transmission occur during the same uplink symbols or slots used by the victim base station without causing interference or causing negligible interference). Once determined, the aggressor base station may perform one or more downlink transmissions over the second set of one or more directional beams while the victim base station performs uplink communications over the first set of one or more directional beams during a same time period.

In other examples, the victim base station (e.g., base station 105-*a*) may utilize explicit beam restriction techniques to mitigate inter-base station interference from the aggressor base station (e.g., base station 105-*b*). For example, the victim base station may receive, from the aggressor base station, one or more reference signals 220 over a first set of one or more directional beams, where the first set of one or more directional beams may be used by the aggressor base station for downlink communications. Using the one or more reference signals 220, the victim base station may perform measurements to determine if a second set of one or more directional beams to be used for uplink communications may experience interference from any beams of the first set of one or more directional beams. That is, the victim base station may determine if any of the first set of one or more directional beams used by the aggressor base station for downlink communications may interfere with any of the second set of one or more directional beams used by the victim base station for uplink communications. The victim base station may further construct a set of beam pairs, where each beam pair of the set of beam pairs may correspond to combinations of respective beams from the first set of one or more directional beams and respective beams from the second set of one or more directional beams. The victim base station may further determine whether each beam pair of the set of beam pairs satisfy an interference threshold level (e.g., based on the measurements of the reference signals) such that a given beam pair may indicate whether both beams in the beam pair may interfere with each other if utilized during a same time period.

Based on the beam pairs and the interference measurements, the victim base station may transmit a message 230 including an indication of which directional beams of the first set of one or more directional beams are allowed for transmitting. That is, the victim base station may transmit an indication to the aggressor base station indicating which beams the aggressor base station may use, such that the aggressor base station does not interfere with the victim base station. In some cases, the victim base station may indicate which beams are allowable for downlink communications at the aggressor base station. In other cases, the victim base station may indicate a restriction (e.g., a soft restriction) of one or more communication parameters, such as a power backoff corresponding to one or more beams of the first set of one or more directional beams. Here, the power backoff may reduce or mitigate interference from the aggressor base station on the uplink beams of the victim base station. In some cases, the victim base station may also indicate corresponding time resources, frequency resources, or both, during which the restriction should be applied.

Based on the message 230, the victim base station may use the second set of one or more directional beams for receiving uplink communications from the UE 115-*b*. Additionally, the aggressor base station may use allowed (e.g., non-restricted) beams to transmit downlink information to a wireless device during the same time period as the uplink communications at the victim base station while mitigating inter-base station interference.

Figure 3:
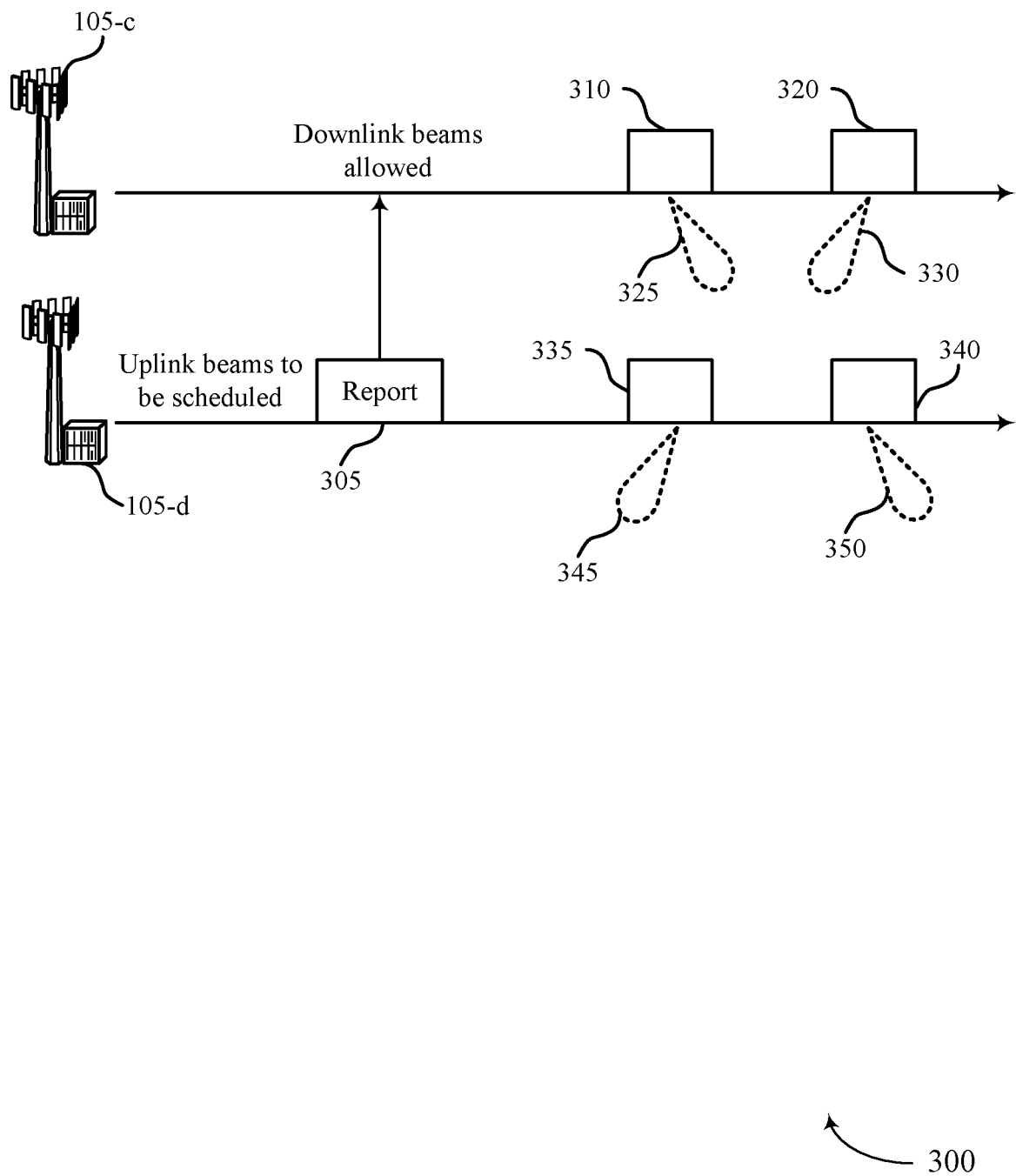
FIG. 3 illustrates an example of a diagram that supports inter-base station interference mitigation in accordance with aspects of the present disclosure.

FIG. 3 illustrates an example of a diagram 300 that supports inter-base station interference mitigation in accordance with aspects of the present disclosure. The diagram 300 illustrates an example of beam pair identification and an explicit beam restriction technique in separate procedures in accordance with examples disclosed herein.

A base station 105-d (e.g., a victim base station) may perform an interference management procedure with a base station 105-c (e.g., an aggressor base station). The interference management procedure may correspond to the victim base station determining if any operations from the aggressor base station may interfere with operations at the victim base station. For example, the victim base station may perform an interference management procedure to determine if downlink communications performed by the aggressor base station may interfere with a first set of one or more directional beams associated with a first set of resources used by the victim base station for uplink communications.

As described with reference with FIG. 2, the victim base station may receive a second set of one or more directional beams over a second set of resources corresponding to resources utilized by the aggressor base station to perform downlink communications. In some cases, the second set of one or more directional beams may correspond to reference signal repetitions. In preparation for upcoming uplink transmissions, the victim base station may perform interference measurements using the first set of one or more directional beams and the second set of one or more directional beams to determine if simultaneous operations at the victim base station and the aggressor base station may result in inter-base station interference. For example, the victim base station may construct beam pairs using respective beams from the first set of one or more directional beams and respective beams from the second set of one or more directional beams. The victim base station may perform one or more measurements for each beam pair to determine if one or more beam pairs exceeds a threshold interference level, and thus, if the coexistence of each beam in the one or more beam pairs may cause inter-base station interference.

For example, the victim base station may initiate interference measurements to determine if any one of three configured uplink beams (e.g., uplink beams to be scheduled) may experience interference due to three downlink beams used by the aggressor base station. The victim base station may construct pairs of beams between the uplink beams and the downlink beams (e.g., uplink beam 1 and downlink beam 1, uplink beam 2 and downlink beam 2, uplink beam 3 and downlink beam 2, and so on). In some cases, the victim base station may perform the interference measurements according to the pairs of beams.

For example, such measurements may correspond to measurements associated with the second set of one or more directional beams, such as respective received signal strength indicator (RSSI) measurements, reference signal receive power (RSRP) measurements, and the like, where the measurements are compared to one or more threshold interference levels (e.g., RSSI thresholds, RSRP thresholds). In some cases, the one or more threshold interference levels may be preconfigured, dynamically configured, or both. For example, a central unit (CU) may configure a distributed unit (DU) with the one or more threshold interference levels (e.g., over F1 signaling). In any case, such beam pairs and measurements may be included in a table, such as Table 1.

TABLE 1

|  | Uplink beam 1 of victim base station | Uplink beam 2 of victim base station | Uplink beam 3 of victim base station |
| --- | --- | --- | --- |
| Downlink beam 1 of aggressor base station | RSSI < Threshold | RSSI < Threshold | RSSI > Threshold |
| Downlink beam 2 of aggressor base station | RSSI < Threshold | RSSI < Threshold | RSSI < Threshold |
| Downlink beam 3 of aggressor base station | RSSI < Threshold | RSSI > Threshold | RSSI < Threshold |

TABLE 1-continued

In some examples, the measurements illustrated in Table 1, the victim base station may update (e.g., periodically) the measured values of the beam pairings based on reference signals received from the aggressor base station. Further, as depicted by the example in Table 1, the victim base station may determine that inter-base station interference may not occur if uplink beams 1 and 2 are utilized by the victim base station and downlink beams 1 and 2 are utilized by the aggressor base station. That is, the victim base station may determine that an RSSI associated with a beam pair between downlink beam 3 and uplink beam 2 may exceed the threshold interference level (e.g., indicated by an underlined table entry in Table 1). Similarly, the victim base station may determine that a beam pair between downlink beam 1 and uplink beam 3 may also exceed the threshold interference level (e.g., also indicated by an underlined table entry in Table 1). Based on such threshold and beam pair comparisons, the victim base station may determine to utilize uplink beams 1 and 2, and indicate to the aggressor base station that downlink beam 3 is not allowed. Accordingly, the victim base station may indicate, to the aggressor base station, which downlink beams are allowed, hard restricted, soft restricted, or any combination thereof. Additionally, the victim base station may determine when each of uplink beams 1 and 2 are to be scheduled within a given time period (e.g., 10 milliseconds (ms)).

In some examples, the victim base station may utilize a backhaul report to transmit the indication of what downlink beams are allowed (e.g., or an indication of what beams of the downlink beams are disallowed) to the aggressor base station. In other examples, such as those illustrated by FIG. 3, the victim base station may transmit an over-the-air (OTA) report 305 to the aggressor base station indicating what downlink beams are allowed within the second set of one or more directional beams. For example, the victim base station may transmit the OTA report 305 to the aggressor base station indicating that downlink beams 1 and 2 are allowed to be utilized for the next given time period on symbols the victim base station utilizes for uplink. In some cases, the OTA report 305 may be transmitted by the victim base station to the aggressor base station over fixed periodic occasions, where the aggressor base station (e.g., and any number of neighboring base stations) may periodically monitor the occasions for the OTA report 305. In other cases, the OTA report 305 may be transmitted in an aperiodic fashion, in a one-time report, and the like. In some examples, the victim base station may periodically update the beam pair information data based on the aggressor base stations reference signal repetitions (e.g., using SSB information).

Based on the OTA report 305, the aggressor base station may utilize downlink beam 1 (e.g., downlink beam 325) in a slot 310 (e.g., downlink, uplink, or flexible slot) while the victim base station simultaneously utilizes uplink beam 1

(e.g., uplink beam 345) in an uplink slot 335 without causing inter-base station interference. Similarly, the aggressor base station may utilize downlink beam 2 (e.g., downlink beam 330) in a second slot 320 (e.g., downlink, uplink, or flexible slot) while the victim base station simultaneously utilizes uplink beam 2 (e.g., uplink beam 350) in an uplink slot 340 without causing inter-base station interference. Additionally or alternatively, the victim base station may indicate, to the aggressor base station, a soft restriction, a hard restriction, or both. In such examples, the restrictions may further indicate time resources to apply the restrictions, frequency resources to apply the restrictions, or both.

Figure 4A:
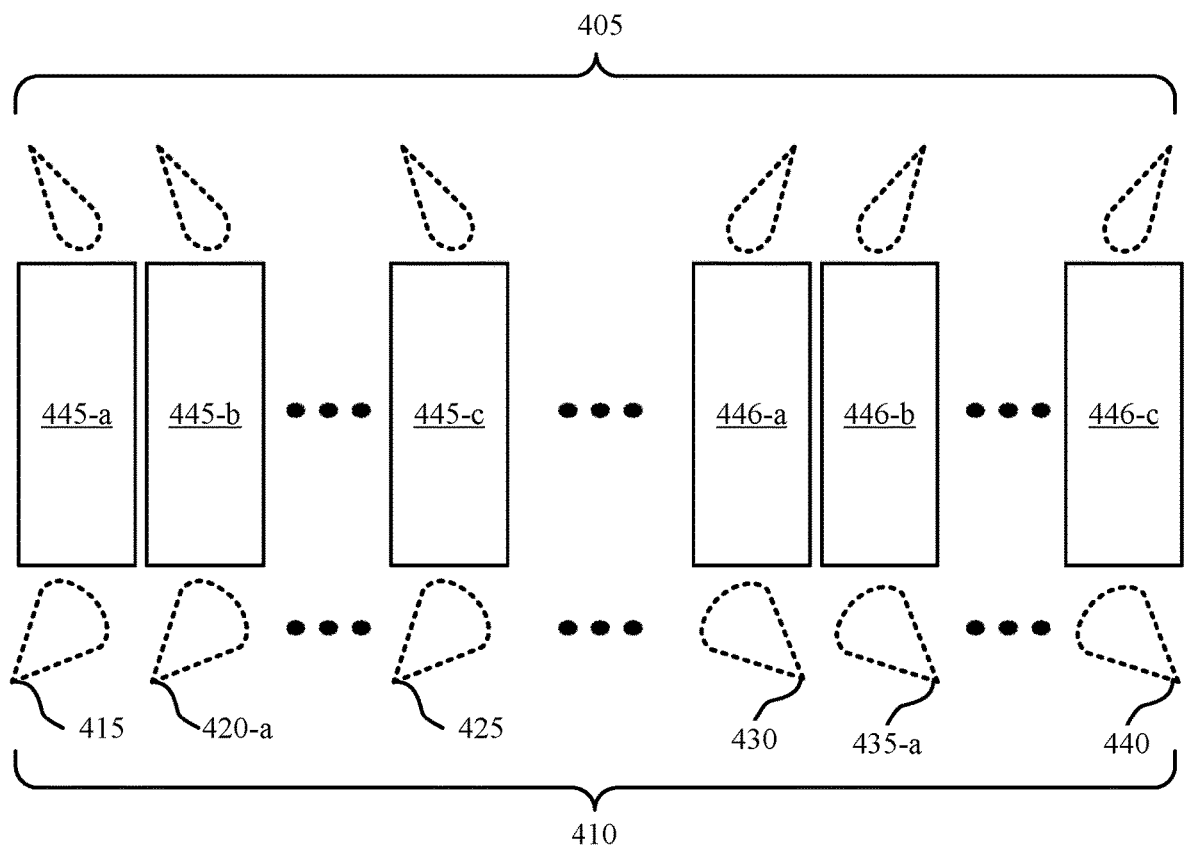
FIGS. 4A and 4B illustrate an example of diagrams that supports inter-base station interference mitigation in accordance with aspects of the present disclosure.

FIG. 4A illustrates an example of a diagram 401 that supports inter-base station interference mitigation in accordance with aspects of the present disclosure. As discussed with reference to FIG. 2, the victim base station may transmit, or otherwise indicate, uplink beams 405 to be used in an upcoming period of time (e.g., over the next 10 ms) with repetitions per uplink beam (e.g., repetitions 445 and 446) based on which the aggressor base station may identify one or more transmitting beams 410 that may cause interference below an indicated threshold for the uplink beams 405. In some cases, the victim base station may transmit an indication of time and frequency resources that correspond to one or more repetitions. In some cases, the period of time may correspond to a period of one or more reference signal repetitions.

For example, the victim base station may transmit uplink beams with associated repetitions, an indication of time and frequency resources, or both. Based on the uplink beams and the indication of the time and frequency resources, the aggressor base station may determine, during interference measurements, if any beams utilized at the aggressor base station may cause interference below an indicated threshold for the transmitted uplink beams. In some cases, the victim base station may indicate a number of repetitions, a time period the repetitions are to be utilized, one or more subbands, or some combination thereof. In such cases, the time period, the one or more subbands, or both, may be associated with dynamically scheduled transmission occasions (e.g., a scheduled physical uplink channel occasion (e.g., a physical uplink control channel (PUCCH) occasion, a physical uplink shared channel (PUSCH) occasion)), semi-static transmission occasions (e.g., scheduled via an uplink configured grant occasion, a random access occasion, or both), or both. In some examples, where the one or more reference signal repetitions, SSBs, or both, are reused for a UE transmission beam refinement procedure and where the reference signal may reuse an associated SSB, the victim base station may indicate which SSB identifiers the aggressor base station may measure. Otherwise, the victim base station may indicate which reference signal repetitions for the aggressor base station to measure.

For example, during a repetition 445-a, the aggressor base station may determine that a transmission beam 415 does not exceed the indicated threshold for the uplink beams 405. The aggressor base station may then determine, for a repetition 445-b, that a transmission beam 420-a does not exceed the indicated threshold for uplink beams 405. Similarly, the aggressor base station may determine, for repetitions 446-b and 446-c, that a transmission beam 435-a and a transmission 440 also do not exceed the indicated threshold for the uplink beams 405. In some examples, the aggressor base station may determine, during repetitions 445-c and 446-a, that the transmission beams 425 and 430 do exceed the indicated threshold for uplink beams 405.

Based on the determinations, the aggressor base station may identify a third set of beams (e.g., one or more transmission beams) that introduce negligible interference (e.g., no interference) to the uplink beams 405.

Figure 4B:
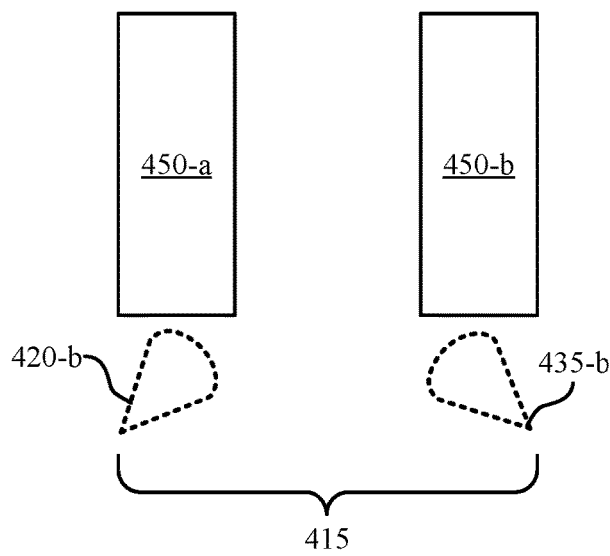

FIG. 4B illustrates an example of a diagram 402 that supports inter-base station interference mitigation in accordance with aspects of the present disclosure. As discussed with reference to FIG. 4A, the aggressor base station may determine one or more transmission beams such that negligible interference is introduced to corresponding uplink beams.

For example, the aggressor base station may determine that transmission beams 420-b and 435-b (e.g., corresponding to transmission beams 420-a and 435-a), may introduce negligible interference to uplink beams (e.g., the uplink beams 405 as illustrated in FIG. 4A). Based on identifying the transmission beams 420-b and 435-b may be used, the aggressor base station may transmit downlink messages to a UE during uplink symbols 450-a and 450-b. For example, the aggressor base station may transmit a first downlink message during the uplink symbols 450-a using transmission beam 420-b while the victim base station concurrently receives an uplink message on the uplink symbols 450-a. Likewise, the aggressor base station may transmit a second downlink message during the uplink symbols 450-b using transmission beam 435-b while the victim base station concurrently receives an uplink message on the uplink symbols 450-b. In both cases, the transmissions by the aggressor base station may have minimal or no interference on the uplink messages received by the victim base station.

Figure 5:
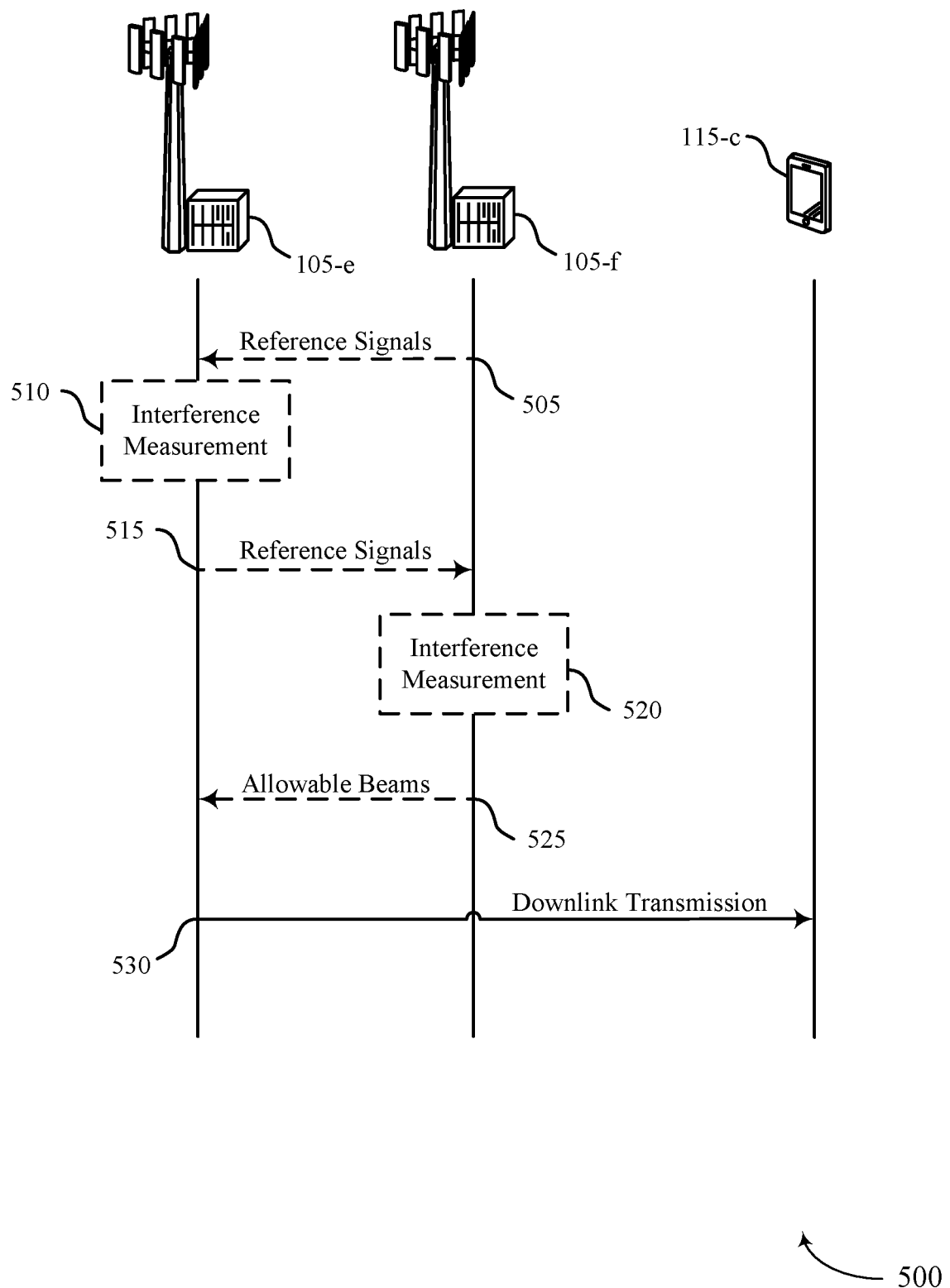
FIG. 5 illustrates an example of a process flow in a system that supports inter-base station interference mitigation in accordance with aspects of the present disclosure.

FIG. 5 illustrates an example of a process flow 500 that supports inter-base station interference mitigation in accordance with aspects of the present disclosure. The process flow 500 may be implemented by one or more aspects of the wireless communications system 100 and the wireless communications system 200. For example, the process flow 500 may correspond to communications between a UE 115-c, a base station 105-e, and a base station 105-f, which may be examples of the UE 115 and the base station 105 as described with reference to FIG. 1. It should be noted that, while examples are discussed below, any number of devices and device types may be used to accomplish implementations described in the present disclosure. In the following description of the process flow 500, operations between the UE 115-c, the base station 105-e, and the base station 105-f may occur in a different order or at different times than as shown. Some operations may also be omitted from the process flow 500, and other operations may be added to the process flow 500.

Optionally, such as in the case of implicit beam restriction, at 505, the base station 105-f (e.g., a victim base station) may reference signals associated with uplink beams to be used in an upcoming period of time (e.g., over the next 10 ms) with repetitions per uplink beam.

Optionally, at 510, the base station 105-e (e.g., an aggressor base station) may perform one or more interference measurements associated with the reference signals at 505. For example, the aggressor base station may determine what beams within the reference signals satisfy an interference level threshold. In some cases, the interference level threshold may correspond to a whether such beams may cause non-negligible interference to the uplink beams if the beams were utilized by the aggressor base station for downlink communications. In such cases, the aggressor base station may determine one or more reference signal repetitions to utilize for downlink communications (e.g., based on whether utilizing such one or more reference signal repetitions may cause negligible interference at the victim base station).

Optionally, such as in the case of explicit beam restriction, at 515, the aggressor base station may transmit reference signals to the victim base station for an interference measurement, where the interference measurement corresponds to the victim base station determining what beam resources may be utilized without causing inter-base station interference. In some cases, the victim base station may initiate the interference measurement, where the aggressor base station transmits the one or more reference signals in response to the initiation.

Optionally, at 520, the victim base station may determine a set of beam pairs between beams slated for downlink communications at the aggressor base station and beams slated for uplink communications at the victim base station. The victim base station may determine, for each beam pair (e.g., uplink beam 1 and downlink beam 1, uplink beam 2 and downlink beam 1, etc.), whether a measurement associated with each beam pair (e.g., RSSI) exceeds an interference level threshold.

Based on whether one or more beam pairs satisfies the interference level threshold, at 525, the victim base station may transmit an indication of what downlink beams are allowable at the aggressor base station. For example, the victim base station may determine to utilize uplink beams 1 and 2, and instruct the aggressor base station to restrict downlink beams 1 and 2 to mitigate inter-base station interference.

At 530, based on either the interference measurement at 510 or at 520, the aggressor base station may perform downlink transmissions on unrestricted beams (e.g., as indicated by the victim base station, as determined by the aggressor base station, or both). Additionally, the victim base station may perform uplink transmissions on a determined set of beams with a wireless device.

Figure 6:
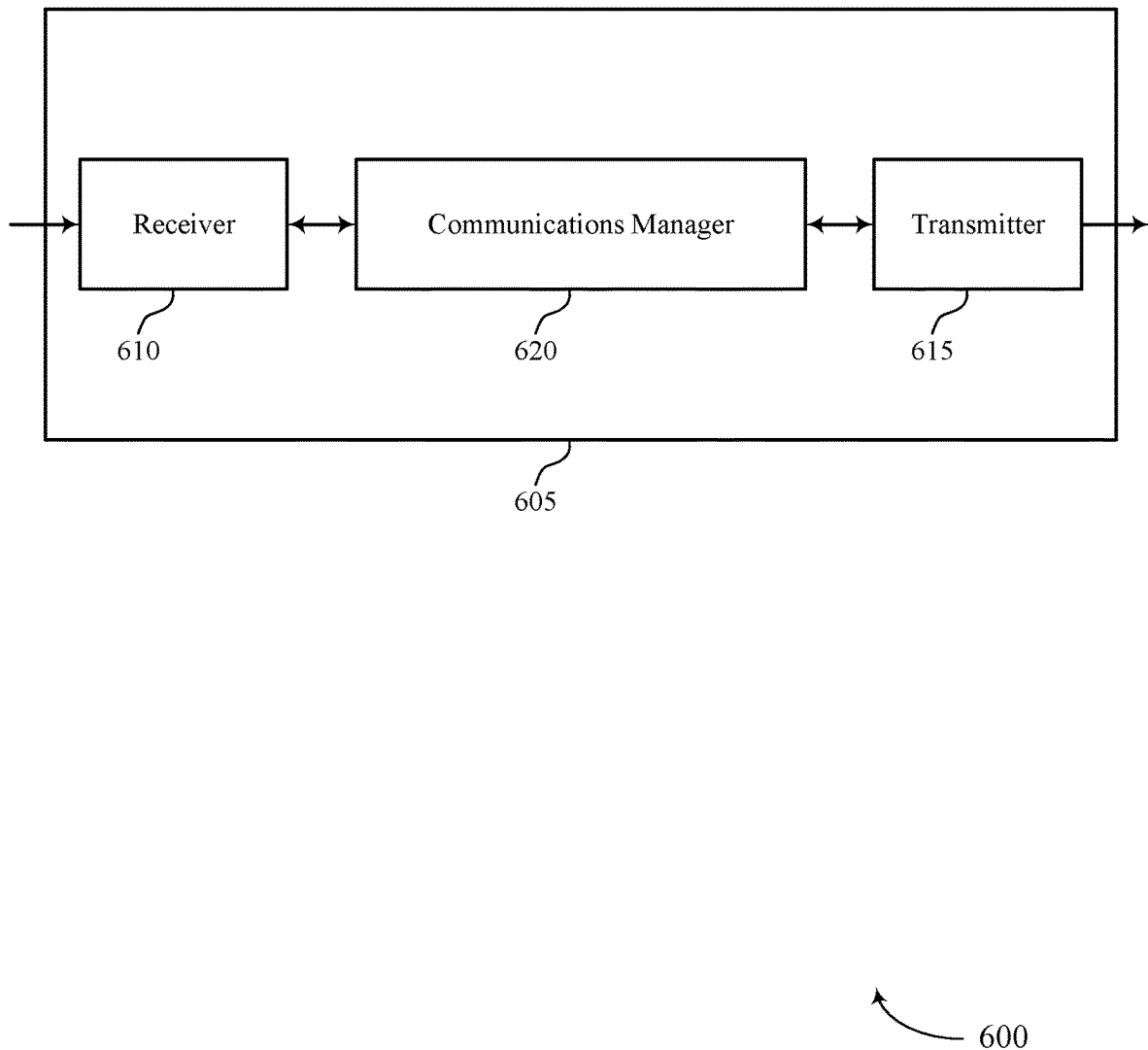
FIGS. 6 and 7 show block diagrams of devices that support inter-base station interference mitigation in accordance with aspects of the present disclosure.

FIG. 6 shows a block diagram 600 of a device 605 that supports inter-base station interference mitigation in accordance with aspects of the present disclosure. The device 605 may be an example of aspects of a network entity or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to inter-base station interference mitigation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to inter-base station interference mitigation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of inter-base station interference mitigation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), an field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first network entity in accordance with examples as disclosed herein. For example, the communications manager 620 may be configured as or otherwise support a means for receiving, from a second network entity, one or more repetitions of a reference signal over a first set of one or more directional beams, the first set of one or more directional beams used by the second network entity for receiving uplink messages. The communications manager 620 may be configured as or otherwise support a means for performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages. The communications manager 620 may be configured as or otherwise support a means for transmitting one or more downlink messages to the wireless device using the second set of one or more directional beams.

Additionally or alternatively, the communications manager 620 may support wireless communications at a first network entity in accordance with examples as disclosed herein. For example, the communications manager 620 may be configured as or otherwise support a means for receiving, from a second network entity, one or more reference signals over a first set of one or more directional beams, the first set of one or more directional beams for transmitting downlink messages to a wireless device. The communications manager 620 may be configured as or otherwise support a means for performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages. The communications manager 620 may be configured as or otherwise support a means for transmitting, to the second network entity, a message including an indication of which directional beams of the first set of one or more directional beams are allowed for transmitting the downlink messages to the wireless device based on the set of beam pairs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources by utilizing implicit beam restriction techniques, explicit beam restriction techniques, or both, to mitigate inter-base station interference as described in the present disclosure.

Figure 7:
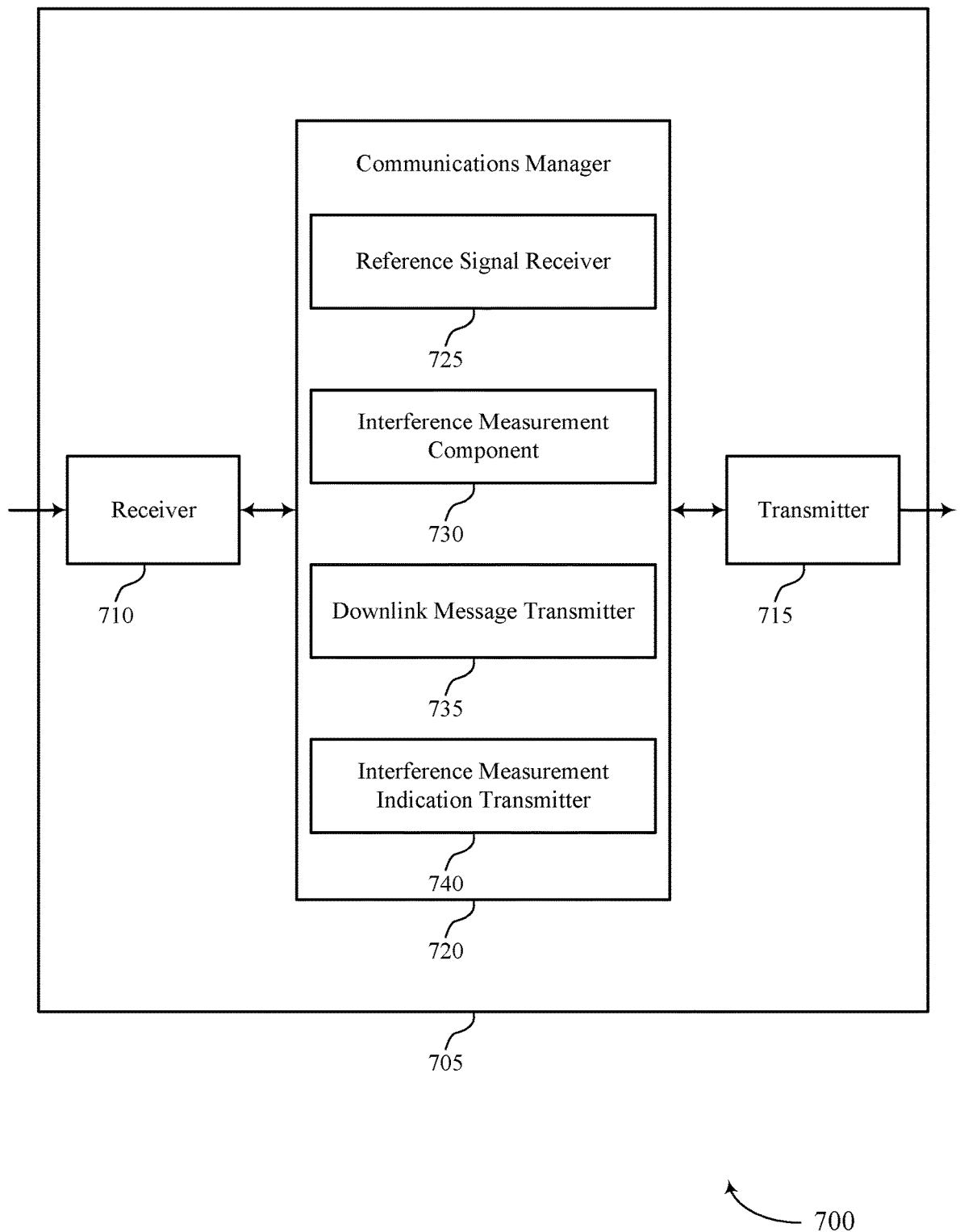

FIG. 7 shows a block diagram 700 of a device 705 that supports inter-base station interference mitigation in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to inter-base station interference mitigation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to inter-base station interference mitigation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of inter-base station interference mitigation as described herein. For example, the communications manager 720 may include a reference signal receiver 725, an interference measurement component 730, a downlink message transmitter 735, an interference measurement indication transmitter 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first network entity in accordance with examples as disclosed herein. The reference signal receiver 725 may be configured as or otherwise support a means for receiving, from a second network entity (e.g., a victim base station, a victim network entity), one or more repetitions of a reference signal over a first set of one or more directional beams, the first set of one or more directional beams used by the second network entity for receiving uplink messages. The interference measurement component 730 may be configured as or otherwise support a means for performing interference measurements on the one or more repetitions of the reference signal, where a second set of one or more directional beams of the first network entity (e.g., an aggressor base station, an aggressor network entity) is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages. The downlink message transmitter 735 may be configured as or otherwise support a means for transmitting one or more downlink messages to the wireless device using the second set of one or more directional beams.

Additionally or alternatively, the communications manager 720 may support wireless communications at a first network entity (e.g., a victim base station, a victim network entity) in accordance with examples as disclosed herein. The reference signal receiver 725 may be configured as or otherwise support a means for receiving, from a second network entity (e.g., an aggressor base station, an aggressor network entity), one or more reference signals over a first set of one or more directional beams, the first set of one or more directional beams for transmitting downlink messages to a wireless device. The interference measurement component 730 may be configured as or otherwise support a means for performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages. The interference measurement indication transmitter 740 may be configured as or otherwise support a means for transmitting, to the second network entity, a message including an indication of which directional beams of the first set of one or more directional beams are allowed for transmitting the downlink messages to the wireless device based on the set of beam pairs.

Figure 8:
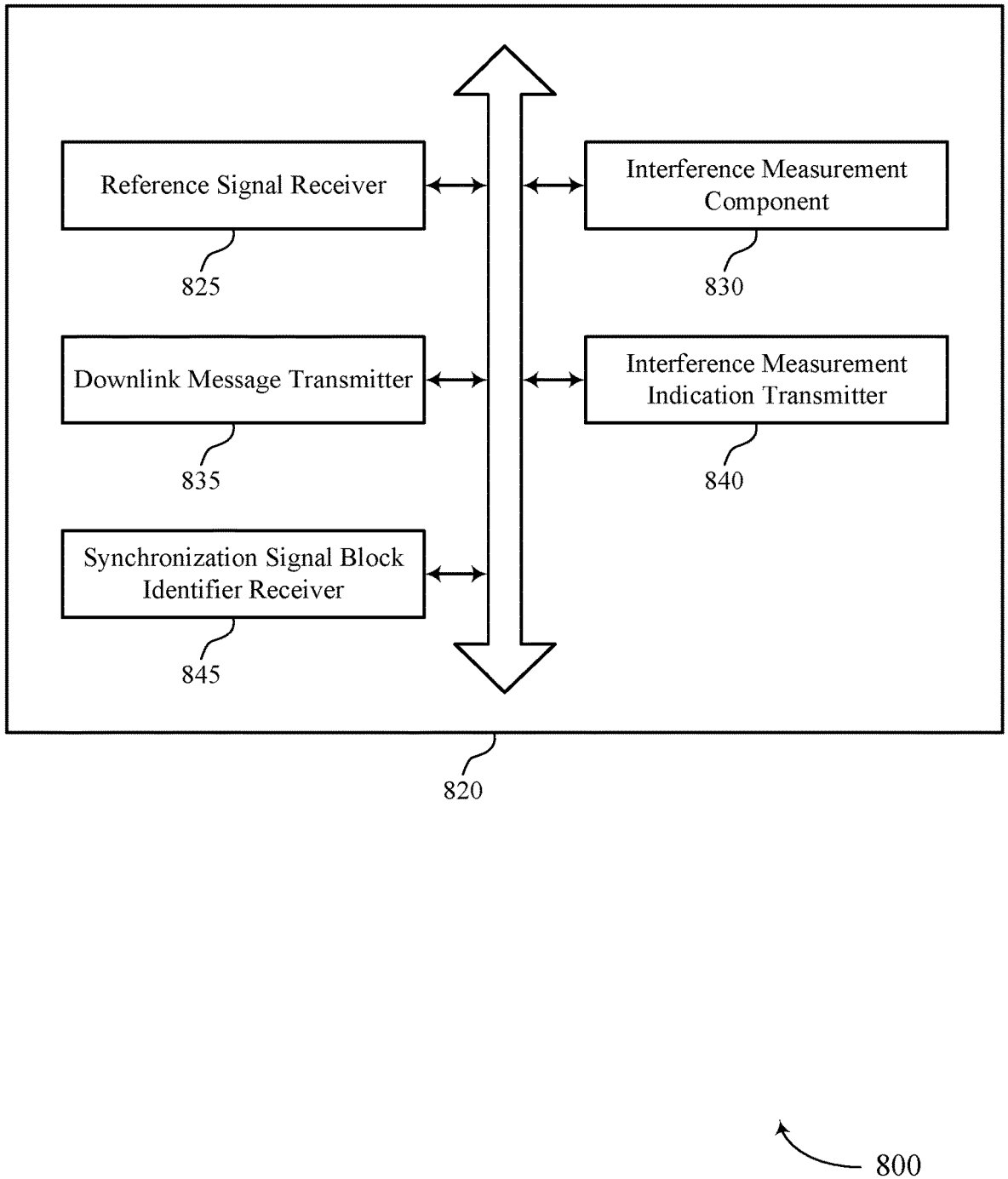
FIG. 8 shows a block diagram of a communications manager that supports inter-base station interference mitigation in accordance with aspects of the present disclosure.

FIG. 8 shows a block diagram 800 of a communications manager 820 that supports inter-base station interference mitigation in accordance with aspects of the present disclosure. The communications manager 820 may be an example of aspects of a communications manager 620, a communications manager 720, or both, as described herein. The communications manager 820, or various components thereof, may be an example of means for performing various aspects of inter-base station interference mitigation as described herein. For example, the communications manager 820 may include a reference signal receiver 825, an interference measurement component 830, a downlink message transmitter 835, an interference measurement indication transmitter 840, a synchronization signal block identifier receiver 845, or any combination thereof. Each of these components may communicate, directly or indirectly, with one another (e.g., via one or more buses).

The communications manager 820 may support wireless communications at a first network entity in accordance with examples as disclosed herein. The reference signal receiver 825 may be configured as or otherwise support a means for receiving, from a second network entity, one or more repetitions of a reference signal over a first set of one or more directional beams, the first set of one or more directional beams used by the second network entity for receiving uplink messages. The interference measurement component 830 may be configured as or otherwise support a means for performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages. The downlink message transmitter 835 may be configured as or otherwise support a means for transmitting one or more downlink messages to the wireless device using the second set of one or more directional beams.

In some examples, the interference measurement component 830 may be configured as or otherwise support a means for receiving, from the second network entity, a message indicating a time period during which the first set of one or more directional beams are to be used by the second network entity for receiving the uplink messages, one or more subbands on which the uplink messages are to be received using the first set of one or more directional beams, or both, where performing the interference measurements is based on the time period or the one or more subbands, or both.

In some examples, the message indicates a number of the one or more repetitions of the reference signal for each directional beam of the first set of one or more directional beams within the time period.

In some examples, the time period or the one or more subbands, or both, are associated with one or more dynamically scheduled transmission occasions or one or more semi-static transmission occasions, or any combination thereof, for the second network entity.

In some examples, the one or more semi-static transmission occasions include an uplink configured grant occasion, a random access occasion, or any combination thereof.

In some examples, the one or more dynamically scheduled transmission occasions includes a scheduled physical uplink channel occasion.

In some examples, the interference measurement component 830 may be configured as or otherwise support a means for receiving, from the second network entity, a second message indicating time and frequency resources that correspond to the one or more repetitions of the reference signal, where performing the interference measurements is based on the time and frequency resources. In some examples, the one or more repetitions of the reference signal include one or more repetitions of an SSB from the second network entity.

In some examples, the synchronization signal block identifier receiver 845 may be configured as or otherwise support a means for receiving, from the second network entity, SSB identifiers corresponding to the one or more repetitions of the SSB, where performing the interference measurements is based on the SSB identifiers. In some examples, the one or more repetitions of the reference signal are associated with a beam refinement procedure at the second network entity.

In some examples, the interference measurement component 830 may be configured as or otherwise support a means for identifying, based on performing the interference measurements, a third set of one or more directional beams of the first network entity, the third set of one or more directional beams being excluded from transmitting the one or more downlink messages based on reference signals corresponding to the third set of one or more directional beams failing to satisfy the threshold.

Additionally or alternatively, the communications manager 820 may support wireless communications at a first network entity in accordance with examples as disclosed herein. In some examples, the reference signal receiver 825 may be configured as or otherwise support a means for receiving, from a second network entity, one or more reference signals over a first set of one or more directional beams, the first set of one or more directional beams for transmitting downlink messages to a wireless device. In some examples, the interference measurement component 830 may be configured as or otherwise support a means for performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages. The interference measurement indication transmitter 840 may be configured as or otherwise support a means for transmitting, to the second network entity, a message including an indication of which directional beams of the first set of one or more directional beams are allowed for transmitting the downlink messages to the wireless device based on the set of beam pairs.

In some examples, the interference measurement component 830 may be configured as or otherwise support a means for determining which directional beams of the second set of one or more directional beams are to be used by the first network entity for receiving one or more uplink messages during a time period, where the message further indicates the time period during which the directional beams of the first set of one or more directional beams are allowed.

In some examples, the message further indicates which directional beams of the first set of one or more directional beams are disallowed for transmitting the downlink messages to the wireless device. In some examples, the message further indicates a time period during which the directional beams of the first set of one or more directional beams are disallowed.

In some examples, to support transmitting the message, the interference measurement indication transmitter 840 may be configured as or otherwise support a means for transmitting the message to the second network entity in accordance with a periodicity.

In some examples, the interference measurement indication transmitter 840 may be configured as or otherwise support a means for transmitting, to the second network entity, a second message including an indication of the set of beam pairs.

In some examples, the message further includes an indication of a restriction of one or more transmission parameters for transmitting the downlink messages to the wireless device based on the interference measurements. In some examples, the restriction of the one or more transmission parameters includes a power backoff.

In some examples, the message further includes an indication of time resources to apply the restriction, frequency resources to apply the restriction, or both, the time resources and the frequency resources corresponding the uplink messages to be received by the first network entity. In some examples, the message includes an over-the-air message, a backhaul message, or both.

In some examples, the interference measurement corresponds to received signal strength indicator measurements, reference signal received power measurements, or any combination thereof. In some examples, the one or more reference signals include SSBs.

Figure 9:
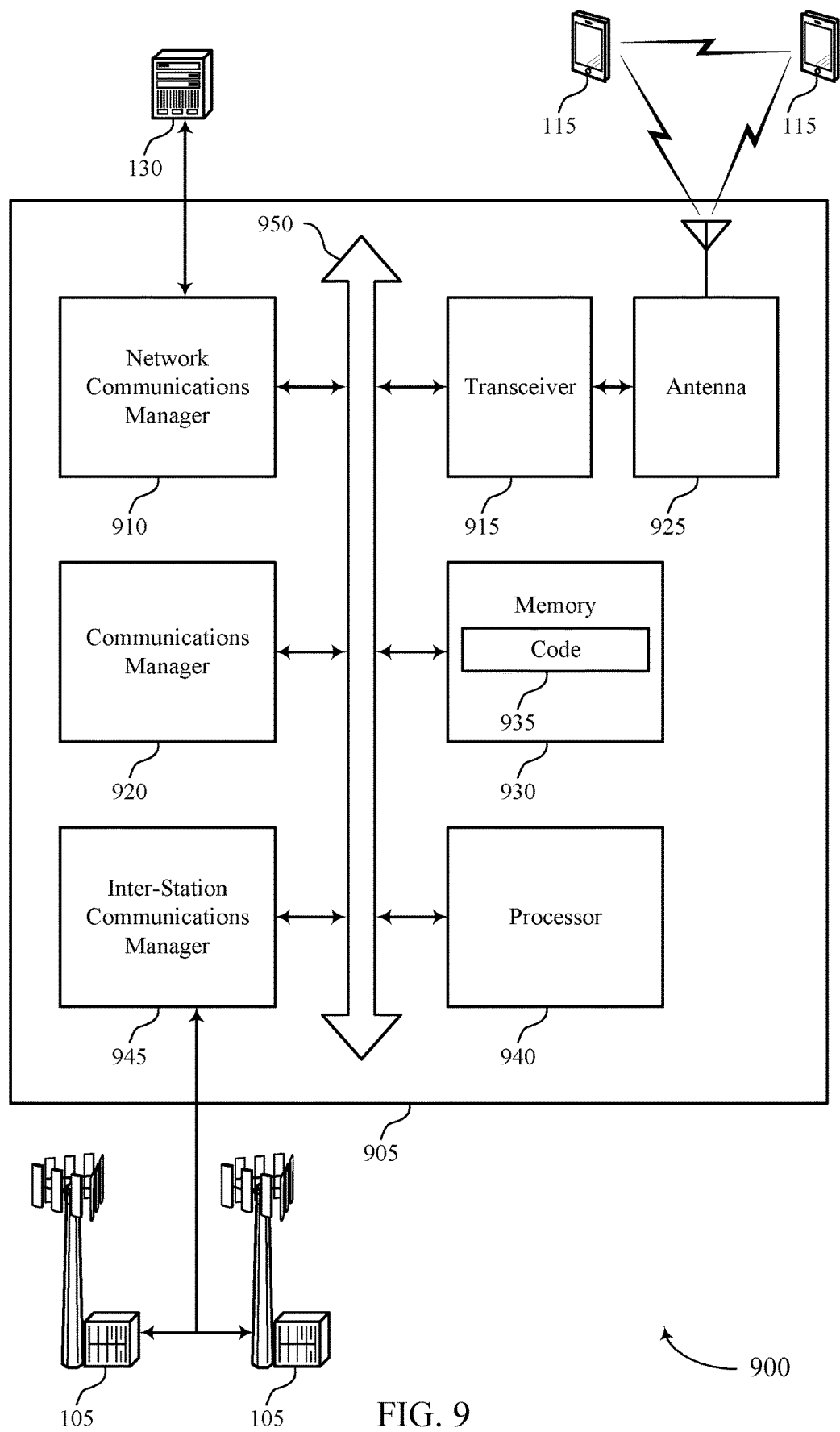
FIG. 9 shows a diagram of a system including a device that supports inter-base station interference mitigation in accordance with aspects of the present disclosure.

FIG. 9 shows a diagram of a system 900 including a device 905 that supports inter-base station interference mitigation in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random-access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting inter-base station interference mitigation). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communications at a first network entity in accordance with examples as disclosed herein. For example, the communications manager 920 may be configured as or otherwise support a means for receiving, from a second network entity, one or more repetitions of a reference signal over a first set of one or more directional beams, the first set of one or more directional beams used by the second network entity for receiving uplink messages. The communications manager 920 may be configured as or otherwise support a means for performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages. The communications manager 920 may be configured as or otherwise support a means for transmitting one or more downlink messages to the wireless device using the second set of one or more directional beams.

Additionally or alternatively, the communications manager 920 may support wireless communications at a first network entity in accordance with examples as disclosed herein. For example, the communications manager 920 may be configured as or otherwise support a means for receiving, from a second network entity, one or more reference signals over a first set of one or more directional beams, the first set of one or more directional beams for transmitting downlink messages to a wireless device. The communications manager 920 may be configured as or otherwise support a means for performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages. The communications manager 920 may be configured as or otherwise support a means for transmitting, to the second network entity, a message including an indication of which directional beams of the first set of one or more directional beams are allowed for transmitting the downlink messages to the wireless device based on the set of beam pairs.

By including or configuring the communications manager 920 in accordance with examples as described herein, the device 905 may support techniques for improved communication reliability, more efficient utilization of communication resources, and improved coordination between devices by utilizing implicit beam restriction techniques, explicit beam restriction techniques, or both, to mitigate inter-base station interference as described in the present disclosure.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of inter-base station interference mitigation as described herein, or the processor 940 and the memory 930 may be otherwise configured to perform or support such operations.

Figure 10:
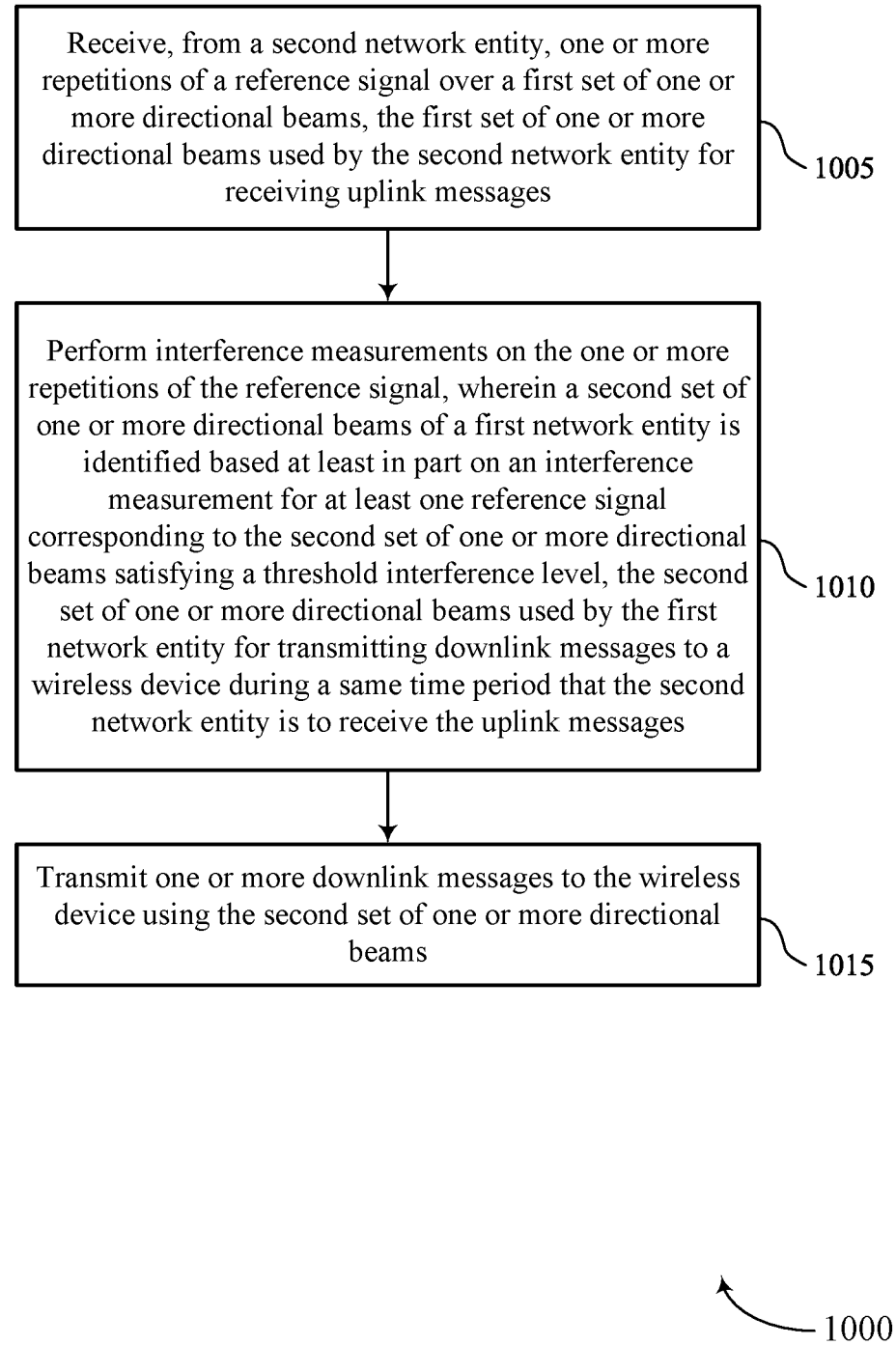
FIGS. 10 through 13 show flowcharts illustrating methods that support inter-base station interference mitigation in accordance with aspects of the present disclosure.

FIG. 10 shows a flowchart illustrating a method 1000 that supports inter-base station interference mitigation in accordance with aspects of the present disclosure. The operations of the method 1000 may be implemented by a base station or its components as described herein. For example, the operations of the method 1000 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1005, the method may include receiving, from a second network entity, one or more repetitions of a reference signal over a first set of one or more directional beams, the first set of one or more directional beams used by the second network entity for receiving uplink messages. The operations of 1005 may be performed in accordance with examples as disclosed herein. In some examples, aspects of the operations of 1005 may be performed by a reference signal receiver 825 as described with reference to FIG. 8.

At 1010, the method may include performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages. The operations of 1010 may be performed in accordance with examples as disclosed herein. In some examples, aspects of the operations of 1010 may be performed by an interference measurement component 830 as described with reference to FIG. 8.

At 1015, the method may include transmitting one or more downlink messages to the wireless device using the second set of one or more directional beams. The operations of 1015 may be performed in accordance with examples as disclosed herein. In some examples, aspects of the operations of 1015 may be performed by a downlink message transmitter 835 as described with reference to FIG. 8.

Figure 11:
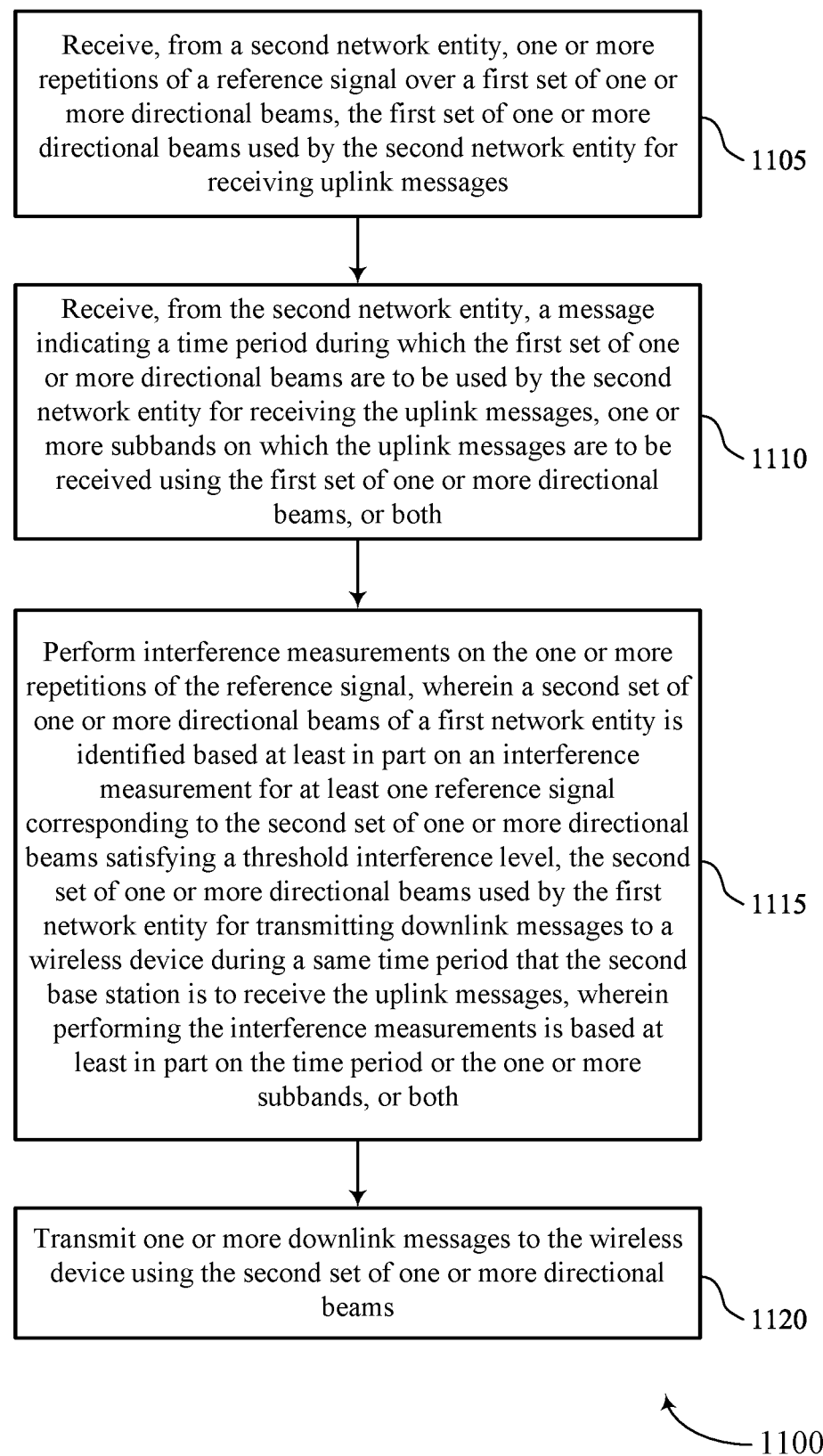

FIG. 11 shows a flowchart illustrating a method 1100 that supports inter-base station interference mitigation in accordance with aspects of the present disclosure. The operations of the method 1100 may be implemented by a base station or its components as described herein. For example, the operations of the method 1100 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1105, the method may include receiving, from a second network entity, one or more repetitions of a reference signal over a first set of one or more directional beams, the first set of one or more directional beams used by the second network entity for receiving uplink messages. The operations of 1105 may be performed in accordance with examples as disclosed herein. In some examples, aspects of the operations of 1105 may be performed by a reference signal receiver 825 as described with reference to FIG. 8.

At 1110, the method may include receiving, from the second network entity, a message indicating a time period during which the first set of one or more directional beams are to be used by the second network entity for receiving the uplink messages, one or more subbands on which the uplink messages are to be received using the first set of one or more directional beams, or both, where performing the interference measurements is based on the time period or the one or more subbands, or both. The operations of 1110 may be performed in accordance with examples as disclosed herein. In some examples, aspects of the operations of 1110 may be performed by an interference measurement component 830 as described with reference to FIG. 8.

At 1115, the method may include performing interference measurements on the one or more repetitions of the reference signal, where a second set of one or more directional beams of the first network entity is identified based on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages. The operations of 1115 may be performed in accordance with examples as disclosed herein. In some examples, aspects of the operations of 1115 may be performed by an interference measurement component 830 as described with reference to FIG. 8.

At 1120, the method may include transmitting one or more downlink messages to the wireless device using the second set of one or more directional beams. The operations of 1120 may be performed in accordance with examples as disclosed herein. In some examples, aspects of the operations of 1120 may be performed by a downlink message transmitter 835 as described with reference to FIG. 8.

Figure 12:
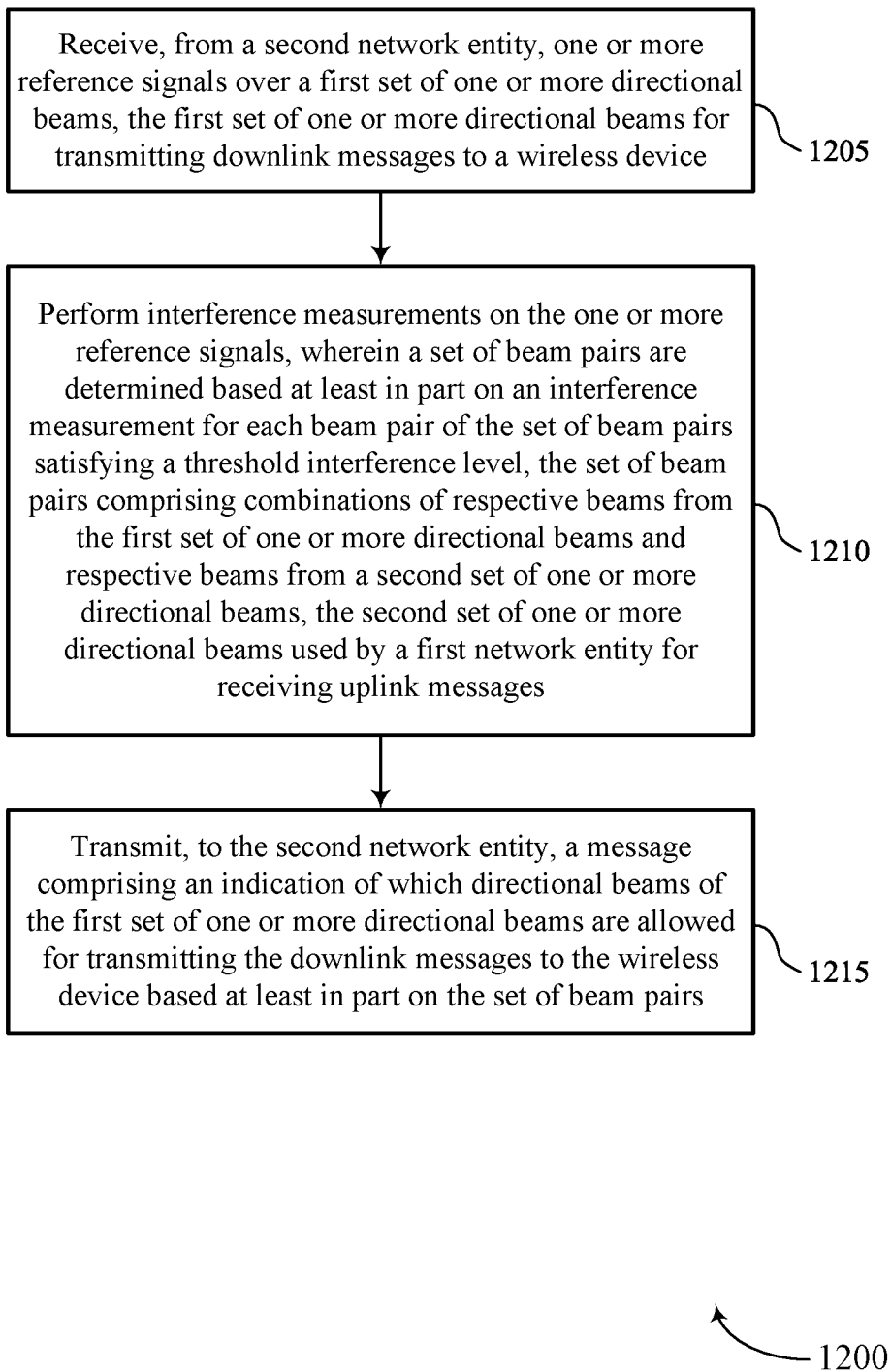

FIG. 12 shows a flowchart illustrating a method 1200 that supports inter-base station interference mitigation in accordance with aspects of the present disclosure. The operations of the method 1200 may be implemented by a base station or its components as described herein. For example, the operations of the method 1200 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1205, the method may include receiving, from a second network entity, one or more reference signals over a first set of one or more directional beams, the first set of one or more directional beams for transmitting downlink messages to a wireless device. The operations of 1205 may be performed in accordance with examples as disclosed herein. In some examples, aspects of the operations of 1205 may be performed by a reference signal receiver 825 as described with reference to FIG. 8.

At 1210, the method may include performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages. The operations of 1210 may be performed in accordance with examples as disclosed herein. In some examples, aspects of the operations of 1210 may be performed by an interference measurement component 830 as described with reference to FIG. 8.

At 1215, the method may include transmitting, to the second network entity, a message including an indication of which directional beams of the first set of one or more directional beams are allowed for transmitting the downlink messages to the wireless device based on the set of beam pairs. The operations of 1215 may be performed in accordance with examples as disclosed herein. In some examples, aspects of the operations of 1215 may be performed by an interference measurement indication transmitter 840 as described with reference to FIG. 8.

Figure 13:
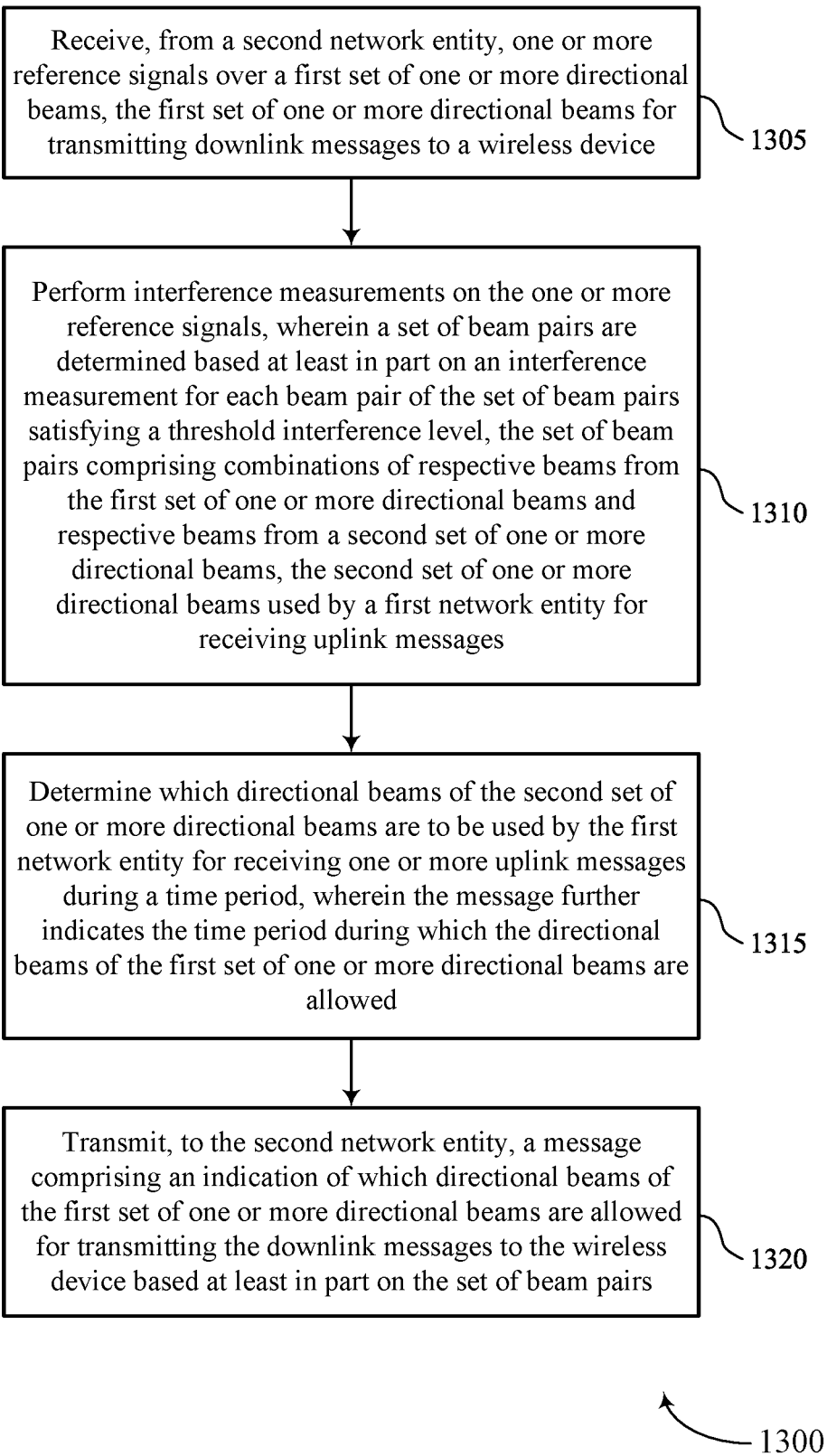

FIG. 13 shows a flowchart illustrating a method 1300 that supports inter-base station interference mitigation in accordance with aspects of the present disclosure. The operations of the method 1300 may be implemented by a base station or its components as described herein. For example, the operations of the method 1300 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1305, the method may include receiving, from a second network entity, one or more reference signals over a first set of one or more directional beams, the first set of one or more directional beams for transmitting downlink messages to a wireless device. The operations of 1305 may be performed in accordance with examples as disclosed herein. In some examples, aspects of the operations of 1305 may be performed by a reference signal receiver 825 as described with reference to FIG. 8.

At 1310, the method may include performing interference measurements on the one or more reference signals, where a set of beam pairs are determined based on an interference measurement for each beam pair of the set of beam pairs satisfying a threshold interference level, the set of beam pairs including combinations of respective beams from the first set of one or more directional beams and respective beams from a second set of one or more directional beams, the second set of one or more directional beams used by the first network entity for receiving uplink messages. The operations of 1310 may be performed in accordance with examples as disclosed herein. In some examples, aspects of the operations of 1310 may be performed by an interference measurement component 830 as described with reference to FIG. 8.

At 1315, the method may include determining which directional beams of the second set of one or more directional beams are to be used by the first network entity for receiving one or more uplink messages during a time period, where the message further indicates the time period during which the directional beams of the first set of one or more directional beams are allowed. The operations of 1315 may be performed in accordance with examples as disclosed herein. In some examples, aspects of the operations of 1315 may be performed by an interference measurement component 830 as described with reference to FIG. 8.

At 1320, the method may include transmitting, to the second network entity, a message including an indication of which directional beams of the first set of one or more directional beams are allowed for transmitting the downlink messages to the wireless device based on the set of beam pairs. The operations of 1320 may be performed in accordance with examples as disclosed herein. In some examples, aspects of the operations of 1320 may be performed by an interference measurement indication transmitter 840 as described with reference to FIG. 8.

The following provides an overview of aspects of the present disclosure:

Aspect 1: A method for wireless communications at a first network entity, comprising: receiving, from a second network entity, one or more repetitions of a reference signal over a first set of one or more directional beams, the first set of one or more directional beams used by the second network entity for receiving uplink messages; performing interference measurements on the one or more repetitions of the reference signal, wherein a second set of one or more directional beams of the first network entity is identified based at least in part on an interference measurement for at least one reference signal corresponding to the second set of one or more directional beams satisfying a threshold interference level, the second set of one or more directional beams used by the first network entity for transmitting downlink messages to a wireless device during a same time period that the second network entity is to receive the uplink messages; and transmitting one or more downlink messages to the wireless device using the second set of one or more directional beams.

Aspect 2: The method of aspect 1, further comprising: receiving, from the second network entity, a message indicating a time period during which the first set of one or more directional beams are to be used by the second network entity for receiving the uplink messages, one or more subbands on which the uplink messages are to be received using the first set of one or more directional beams, or both, wherein performing the interference measurements is based at least in part on the time period or the one or more subbands, or both.

Aspect 3: The method of aspect 2, wherein the message indicates a number of the one or more repetitions of the reference signal for each directional beam of the first set of one or more directional beams within the time period.

Aspect 4: The method of any of aspects 2 through 3, wherein the time period or the one or more subbands, or both, are associated with one or more dynamically scheduled transmission occasions or one or more semi-static transmission occasions, or any combination thereof, for the second network entity.

Aspect 5: The method of aspect 4, wherein the one or more semi-static transmission occasions comprise an uplink configured grant occasion, a random access occasion, or any combination thereof.

Aspect 6: The method of any of aspects 4 through 5, wherein the one or more dynamically scheduled transmission occasions comprises a scheduled physical uplink channel occasion.

Aspect 7: The method of any of aspects 1 through 6, further comprising: receiving, from the second network entity, a second message indicating time and frequency resources that correspond to the one or more repetitions of the reference signal, wherein performing the interference measurements is based at least in part on the time and frequency resources.

Aspect 8: The method of any of aspects 1 through 7, wherein the one or more repetitions of the reference signal comprise one or more repetitions of an SSB from the second network entity.

Aspect 9: The method of aspect 8, further comprising: receiving, from the second network entity, SSB identifiers corresponding to the one or more repetitions of the SSB, wherein performing the interference measurements is based at least in part on the SSB identifiers.

Aspect 10: The method of any of aspects 1 through 9, wherein the one or more repetitions of the reference signal are associated with a beam refinement procedure at the second network entity.

Aspect 11: The method of any of aspects 1 through 10, further comprising: identifying, based at least in part on performing the interference measurements, a third set of one or more directional beams of the first network entity, the third set of one or more directional beams being excluded from transmitting the one or more downlink messages based at least in part on reference signals corresponding to the third set of one or more directional beams failing to satisfy the threshold.

Aspect 12: A method for wireless communications at a first network entity, comprising: receiving, from a second network entity, one or more reference signals over a first set of one or more directional beams, the first set of one or more directional beams for transmitting downlink messages to a wireless device; performing interference measurements on the one or more reference signals, wherein a set of beam pairs are determined based at least in part on an interference measurement for each beam pair of the set of beam pairs satisfying a threshold interference level, the set of beam pairs comprising combinations of respective beams from the first set of one or more directional beams and respective beams from a second set of one or more directional beams, the second set of one or more directional beams used by the first network entity for receiving uplink messages; and transmitting, to the second network entity, a message comprising an indication of which directional beams of the first set of one or more directional beams are allowed for transmitting the downlink messages to the wireless device based at least in part on the set of beam pairs.

Aspect 13: The method of aspect 12, further comprising: determining which directional beams of the second set of one or more directional beams are to be used by the first network entity for receiving one or more uplink messages during a time period, wherein the message further indicates the time period during which the directional beams of the first set of one or more directional beams are allowed.

Aspect 14: The method of any of aspects 12 through 13, wherein the message further indicates which directional beams of the first set of one or more directional beams are disallowed for transmitting the downlink messages to the wireless device.

Aspect 15: The method of aspect 14, wherein the message further indicates a time period during which the directional beams of the first set of one or more directional beams are disallowed.

Aspect 16: The method of any of aspects 12 through 15, wherein transmitting the message comprises: transmitting the message to the second network entity in accordance with a periodicity.

Aspect 17: The method of any of aspects 12 through 16, further comprising: transmitting, to the second network entity, a second message comprising an indication of the set of beam pairs.

Aspect 18: The method of any of aspects 12 through 17, wherein the message further comprises an indication of a restriction of one or more transmission parameters for transmitting the downlink messages to the wireless device based at least in part on the interference measurements.

Aspect 19: The method of aspect 18, wherein the restriction of the one or more transmission parameters comprises a power backoff.

Aspect 20: The method of aspect 19, wherein the message further comprises an indication of time resources to apply the restriction, frequency resources to apply the restriction, or both, the time resources and the frequency resources corresponding the uplink messages to be received by the first network entity.

Aspect 21: The method of any of aspects 12 through 20, wherein the message comprises an over-the-air message, a backhaul message, or both.

Aspect 22: The method of any of aspects 12 through 21, wherein the interference measurement corresponds to received signal strength indicator measurements, reference signal received power measurements, or any combination thereof.

Aspect 23: The method of any of aspects 12 through 22, wherein the reference signals comprise SSBs.

Aspect 24: An apparatus for wireless communications at a first network entity, comprising a processor; memory coupled with the processor; and instructions stored in the memory and executable by the processor to cause the apparatus to perform a method of any of aspects 1 through 11.

Aspect 25: An apparatus for wireless communications at a first network entity, comprising at least one means for performing a method of any of aspects 1 through 11.

Aspect 26: A non-transitory computer-readable medium storing code for wireless communications at a first network entity, the code comprising instructions executable by a processor to perform a method of any of aspects 1 through 11.

Aspect 27: An apparatus for wireless communications at a first network entity, comprising a processor; memory coupled with the processor; and instructions stored in the memory and executable by the processor to cause the apparatus to perform a method of any of aspects 12 through 23.

Aspect 28: An apparatus for wireless communications at a first network entity, comprising at least one means for performing a method of any of aspects 12 through 23.

Aspect 29: A non-transitory computer-readable medium storing code for wireless communications at a first network entity, the code comprising instructions executable by a processor to perform a method of any of aspects 12 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first network entity, comprising:
   receiving, from a second network entity, a message indicating a time period during which a first set of one or more directional beams are to be used by the second network entity for receiving uplink messages, wherein the time period is associated with one or more dynamically scheduled transmission occasions, one or more semi-static transmission occasions, or both, for the second network entity;
   receiving, from the second network entity, one or more repetitions of a reference signal over the first set of one or more directional beams;
   performing interference measurements on the one or more repetitions of the reference signal, wherein a second set of one or more directional beams of the first network entity is identified based at least in part on an interference measurement for at least one reference signal corresponding to the second set of one or more directional beams satisfying a threshold interference level, the second set of one or more directional beams used by the first network entity for transmitting downlink messages to a wireless device during the time period that the second network entity is to receive the uplink messages; and
   transmitting one or more downlink messages to the wireless device using the second set of one or more directional beams.

2. The method of claim 1, wherein the message further indicates one or more subbands on which the uplink messages are to be received using the first set of one or more directional beams, or both, wherein performing the interference measurements is based at least in part on the one or more subbands.

3. The method of claim 1, wherein the message indicates a number of the one or more repetitions of the reference signal for each directional beam of the first set of one or more directional beams within the time period.

4. The method of claim 2, wherein the one or more subbands are associated with the one or more dynamically scheduled transmission occasions or the one or more semi-static transmission occasions, or any combination thereof, for the second network entity.

5. The method of claim 4, wherein the one or more semi-static transmission occasions comprise an uplink configured grant occasion, a random access occasion, or any combination thereof.

6. The method of claim 4, wherein the one or more dynamically scheduled transmission occasions comprises a scheduled physical uplink channel occasion.

7. The method of claim 1, further comprising:
   receiving, from the second network entity, a second message indicating time and frequency resources that correspond to the one or more repetitions of the reference signal, wherein performing the interference measurements is based at least in part on the time and frequency resources.

8. The method of claim 1, wherein the one or more repetitions of the reference signal comprise one or more repetitions of a synchronization signal block from the second network entity.

9. The method of claim 8, further comprising:
   receiving, from the second network entity, synchronization signal block identifiers corresponding to the one or more repetitions of the synchronization signal block, wherein performing the interference measurements is based at least in part on the synchronization signal block identifiers.

10. The method of claim 1, wherein the one or more repetitions of the reference signal are associated with a beam refinement procedure at the second network entity.

11. The method of claim 1, further comprising:
    identifying, based at least in part on performing the interference measurements, a third set of one or more directional beams of the first network entity, the third set of one or more directional beams being excluded from transmitting the one or more downlink messages based at least in part on reference signals corresponding to the third set of one or more directional beams failing to satisfy the threshold interference level.

12. A method for wireless communications at a first network entity, comprising:
    receiving, from a second network entity, one or more reference signals over a first set of one or more directional beams, the first set of one or more directional beams for transmitting downlink messages to a wireless device;
    performing interference measurements on the one or more reference signals, wherein a set of beam pairs are determined based at least in part on an interference measurement for each beam pair of the set of beam pairs satisfying a threshold interference level, the set of beam pairs comprising combinations of respective beams from the first set of one or more directional beams and respective beams from a second set of one or more directional beams, the second set of one or more directional beams used by the first network entity for receiving uplink messages; and transmitting, to the second network entity, a message comprising an indication of which directional beams of the first set of one or more directional beams are allowed for transmitting the downlink messages to the wireless device based at least in part on the set of beam pairs, wherein the message further comprises an indication of a restriction of one or more transmission parameters for transmitting the downlink messages to the wireless device based at least in part on the interference measurements.

13. The method of claim 12, further comprising:
determining which directional beams of the second set of one or more directional beams are to be used by the first network entity for receiving one or more uplink messages during a time period, wherein the message further indicates the time period during which the directional beams of the first set of one or more directional beams are allowed.

14. The method of claim 12, wherein the message further indicates which directional beams of the first set of one or more directional beams are disallowed for transmitting the downlink messages to the wireless device.

15. The method of claim 14, wherein the message further indicates a time period during which the directional beams of the first set of one or more directional beams are disallowed.

16. The method of claim 12, wherein transmitting the message comprises:
transmitting the message to the second network entity in accordance with a periodicity.

17. The method of claim 12, further comprising:
transmitting, to the second network entity, a second message comprising an indication of the set of beam pairs.

18. The method of claim 12, wherein the restriction of the one or more transmission parameters comprises a power backoff.

19. The method of claim 18, wherein the message further comprises an indication of time resources to apply the restriction, frequency resources to apply the restriction, or both, the time resources and the frequency resources corresponding the uplink messages to be received by the first network entity.

20. The method of claim 12, wherein the message comprises an over-the-air message, a backhaul message, or both.

21. The method of claim 12, wherein the interference measurement corresponds to received signal strength indicator measurements, reference signal received power measurements, or any combination thereof.

22. The method of claim 12, wherein the one or more reference signals comprise synchronization signal blocks.

23. An apparatus for wireless communications at a first network entity, comprising:
one or more processors; and
one or more memories coupled with the one or more processors, wherein the one or more processors are configured to cause the apparatus to:

from a second network entity, a message indicating a time period during which a first set of one or more directional beams are to be used by the second network entity for receiving uplink messages, wherein the time period is associated with one or more dynamically scheduled transmission occasions, one or more semi-static transmission occasions, or both for the second network entity;

receive, from the second network entity, one or more repetitions of a reference signal over the first set of one or more directional beams, perform interference measurements on the one or more repetitions of the reference signal, wherein a second set of one or more directional beams of the first network entity is identified based at least in part on an interference measurement for at least one reference signal corresponding to the second set of one or more directional beams satisfying a threshold interference level, the second set of one or more directional beams used by the first network entity for transmitting downlink messages to a wireless device during the time period that the second network entity is to receive the uplink messages; and transmit one or more downlink messages to the wireless device using the second set of one or more directional beams.

24. The apparatus of claim 23, wherein the message further indicates one or more subbands on which the uplink messages are to be received using the first set of one or more directional beams, wherein performing the interference measurements is based at least in part on the one or more subbands.

25. The apparatus of claim 23, wherein the message indicates a number of the one or more repetitions of the reference signal for each directional beam of the first set of one or more directional beams within the time period.

26. The apparatus of claim 24, wherein the one or more subbands are associated with the one or more dynamically scheduled transmission occasions or the one or more semi-static transmission occasions, or any combination thereof, for the second network entity.

27. The apparatus of claim 26, wherein the one or more semi-static transmission occasions comprise an uplink configured grant occasion, a random access occasion, or any combination thereof.

28. The apparatus of claim 26, wherein the one or more dynamically scheduled transmission occasions comprises a scheduled physical uplink channel occasion.

29. An apparatus for wireless communications at a first network entity, comprising:
one or more processors; and
one or more memories coupled with the one or more processors, wherein the one or more processors are configured to cause the apparatus to:
receive, from a second network entity, one or more reference signals over a first set of one or more directional beams, the first set of one or more directional beams for transmitting downlink messages to a wireless device;
perform interference measurements on the one or more reference signals, wherein a set of beam pairs are determined based at least in part on an interference measurement for each beam pair of the set of beam pairs satisfying a threshold interference level, the set of beam pairs comprising combinations of respective beams from the first set of one or more directional beams and respective beams from a second set of one or more directional beams, the second set of one or more directional beams used by the first network entity for receiving uplink messages; and transmit, to the second network entity, a message comprising an indication of which directional beams of the first set of one or more directional beams are allowed for transmitting the downlink messages to the wireless device based at least in part on the set of beam pairs, wherein the message further comprises an indication of a restriction of one or more transmission parameters for transmitting the downlink messages to the wireless device based at least in part on the interference measurements.

\* \* \* \* \*